(12) United States Patent
Nobe

(10) Patent No.: US 10,816,935 B2
(45) Date of Patent: Oct. 27, 2020

(54) MOTOR DRIVING APPARATUS, MOTOR CONTROL METHOD, AND TIMEPIECE

(71) Applicant: Seiko Instruments Inc., Chiba-shi, Chiba (JP)

(72) Inventor: Tetsuya Nobe, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/505,311

(22) Filed: Jul. 8, 2019

(65) Prior Publication Data

US 2020/0019123 A1    Jan. 16, 2020

(30) Foreign Application Priority Data

Jul. 12, 2018  (JP) .................................. 2018-132226

(51) Int. Cl.
*G04C 3/14* (2006.01)
*H02P 8/02* (2006.01)
*H02K 37/14* (2006.01)

(52) U.S. Cl.
CPC .................. *G04C 3/14* (2013.01); *H02P 8/02* (2013.01); *H02K 37/14* (2013.01)

(58) Field of Classification Search
CPC ....................................... G04C 3/14; H02P 8/02
See application file for complete search history.

(56) References Cited

U.S. PATENT DOCUMENTS

| 6,163,126 | A | * | 12/2000 | Kojima | ................... G04C 3/14 318/685 |
| 6,288,475 | B1 | * | 9/2001 | Ito | .......................... H02N 2/147 310/323.01 |
| 2016/0134205 | A1 | * | 5/2016 | Bock | ..................... H01H 9/563 318/778 |

FOREIGN PATENT DOCUMENTS

| JP | 56-15163 | 2/1981 |
| JP | 57-156662 | 9/1982 |
| JP | 2006-101618 | 4/2006 |

* cited by examiner

*Primary Examiner* — Cortez M Cook
(74) *Attorney, Agent, or Firm* — Brinks Gilson & Lione

(57) ABSTRACT

A motor driving apparatus is a pulse generation circuit applying a drive pulse for rotating a rotor to a two stepping motor including the rotor magnetized in two poles and a stator in which a two-phase coil is wound around a yoke. The drive pulse is constituted of a drive pulse P1 and a drive pulse P2. The pulse generation circuit applies the drive pulse P1 having a stable stationary position at which a rotor rotation angle from a reference position is 90 degrees or less and applies the drive pulse P2 having a stable stationary position at which the rotor rotation angle from the reference position is 90 degrees or more continuously to the application of the drive pulse P1.

9 Claims, 15 Drawing Sheets

FIG. 5

| | | 45 | 90 | 135 | 180 | 225 | 270 | 315 | 0 |
|---|---|---|---|---|---|---|---|---|---|
| SECOND COIL 50B | Out1 | H | H | L | L | L | L | L | H |
| | Out2 | L | L | L | H | H | H | L | L |
| FIRST COIL 50A | Out3 | L | H | H | H | L | L | L | L |
| | Out4 | L | L | L | L | L | H | H | H |
| FIRST MAGNETIC POLE PORTION 20A | | S | S | S | S | N | N | N | N |
| SECOND MAGNETIC POLE PORTION 20B | | N | N | N | S | S | S | N | N |
| THIRD MAGNETIC POLE PORTION 20C | | S | | N | N | N | | S | S |

FIG. 6
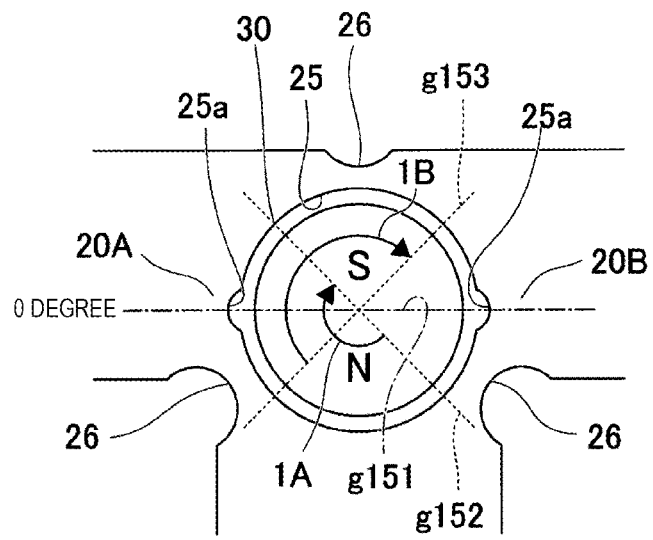
FIG. 7
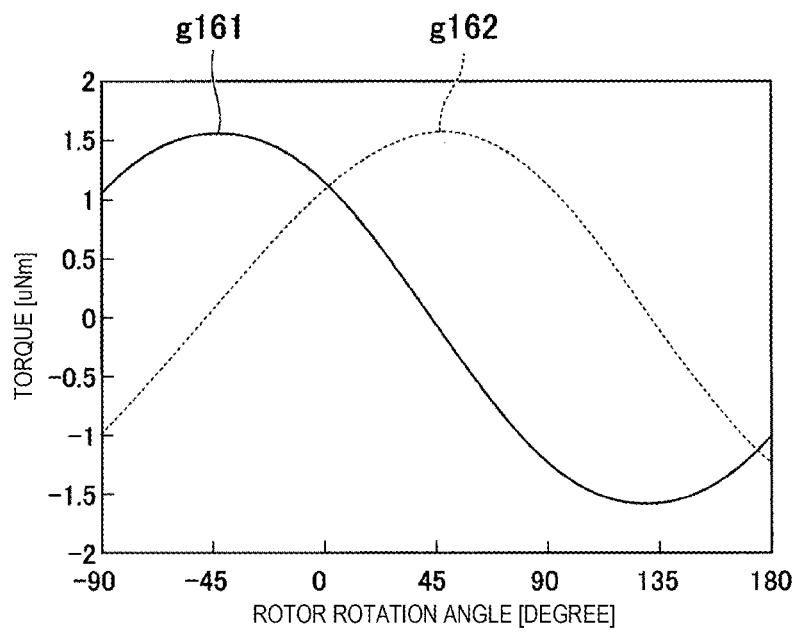
FIG. 8
| ROTOR ROTATION ANGLE | NON-EXCITATION | 1A | 1B |
|---|---|---|---|
| 0→45 DEGREES | NEGATIVE | POSITIVE | POSITIVE |
| 45→90 DEGREES | NEGATIVE | NEGATIVE | POSITIVE |
| 90→135 DEGREES | POSITIVE | NEGATIVE | POSITIVE |
| 135→180 DEGREES | POSITIVE | NEGATIVE | NEGATIVE |

FIG. 16

| P1 | 90(45) |
|---|---|
| P2 | 180 |
| WAITING PERIOD | 0.5ms OR MORE |

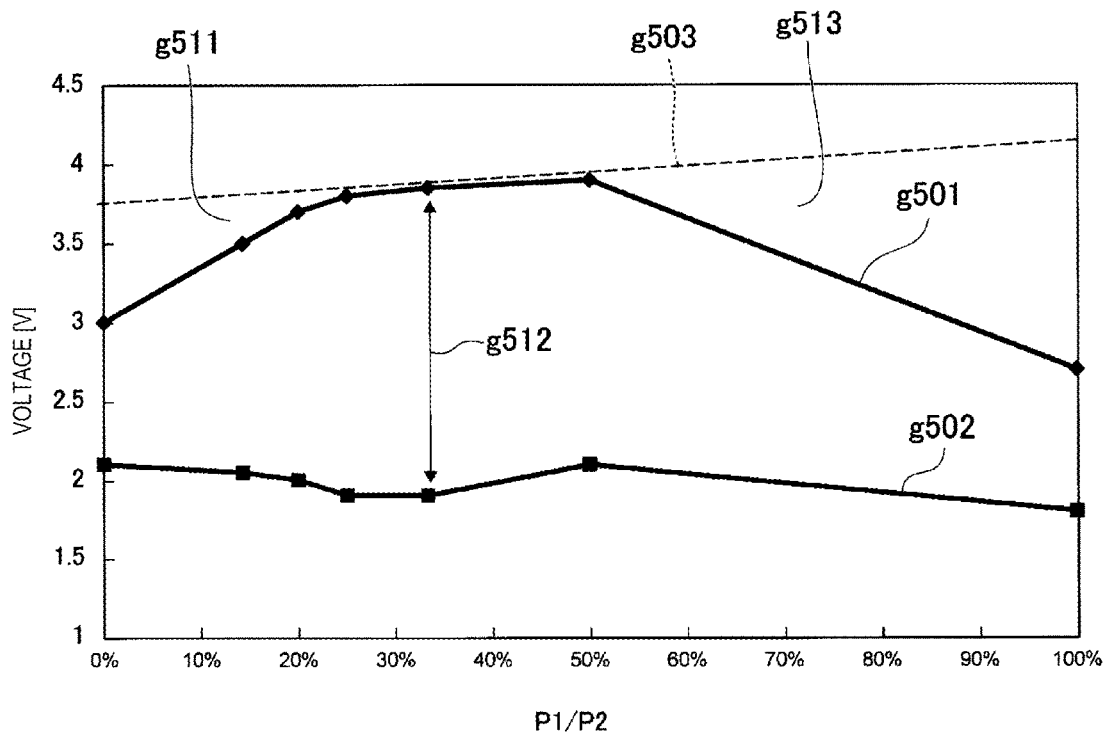

MOTOR DRIVING APPARATUS, MOTOR CONTROL METHOD, AND TIMEPIECE

RELATED APPLICATIONS

Priority is claimed on Japanese Patent Application No. 2018-132226, filed on Jul. 12, 2018, the content of which is incorporated herein by reference.

BACKGROUND OF THE THE INVENTION

1. Field of the Invention

The present disclosure relates to a motor driving apparatus, a motor control method, and a timepiece.

2. Description of the Related Art

An analog electronic timepiece uses a stepping motor having two coils to move pointers such as an hour hand, a minute hand, and a second hand. Such a stepping motor has coils, a stator, a rotor magnetized in two poles.

JP-A-56-15163 and JP-B-2-016679 disclose a stepping motor which has two coils. The stepping motor can rotate in forward and reverse directions by applying an appropriate pulse to the motor.

In addition, a stepping motor having two coils is proposed in which an induced voltage generated according to the rotation of a rotor is detected against disturbances such as a load fluctuation of the motor, a power source voltage fluctuation, a temperature, and vibration, and a drive pulse width during a period in which an induced voltage is detected according to the detected induced voltage is adjusted (for example, see JP-A-2006-101618).

In addition, at least one battery is used in the analog electronic timepiece. The battery is, for example, a button battery, a solar battery, a secondary battery, or the like. When the analog electronic timepiece is actuated using such a battery, a voltage value supplied from the battery is changed depending on load fluctuation of the motor, a temperature, a remaining amount of the battery, or the like. Therefore, in the analog electronic timepiece, it is desirable to make a control circuit of the motor correspond to a wide voltage range.

However, in a case where techniques described in JP-A-56-15163 and JP-B-2-016679 correspond to a wide voltage range, there is a concern that an excessive torque occurs at high voltage and steeping out occurs due to an insufficient torque at low voltage. In addition, in a case where the technique described in JP-A-2006-101618 corresponds to the wide voltage range, pulse adjustment is performed by performing rotation detection, so that a system is complicated.

SUMMARY OF THE INVENTION

An embodiment of the present disclosure provides a motor driving apparatus, a motor control method and a timepiece capable of performing a stable operation in a wide voltage range.

According to an embodiment of the present disclosure, there is provided a motor driving apparatus including a pulse generation circuit applying a drive pulse for rotating a rotor to a two-phase stepping motor including the rotor magnetized in two poles and a stator in which a two-phase coil is wound around a yoke. The drive pulse is constituted of a drive pulse P1 and a drive pulse P2. The pulse generation circuit applies the drive pulse P1 having a stable stationary position at which a rotor rotation angle from a reference position is 90 degrees or less and applies the drive pulse P2 having a stable stationary position at which the rotor rotation angle from the reference position is 90 degrees or more continuously to the application of the drive pulse P1.

In addition, in the motor driving apparatus according to the embodiment of the present disclosure, energy of the drive pulse P2 may be larger than energy of the drive pulse P1.

In addition, in the motor driving apparatus according to the embodiment of the present disclosure, an application time of the drive pulse P1 may be shorter than an application time of the drive pulse P2.

In addition, in the motor driving apparatus according to the embodiment of the present disclosure, an application time of the drive pulse P1 may be ½ or less of an application time of the drive pulse P2.

In addition, in the motor driving apparatus according to the embodiment of the present disclosure, an application time of the drive pulse P1 may be ⅕ or more of an application time of the drive pulse P2.

In addition, in the motor driving apparatus according to the embodiment of the present disclosure, the pulse generation circuit may provide a waiting period for stopping the application of the pulse continuously to the application of the drive pulse P2.

In addition, in the motor driving apparatus according to the embodiment of the present disclosure, the waiting period may be 0.5 ms or more and 2 ms or less.

In addition, in the motor driving apparatus according to the embodiment of the present disclosure, the drive pulse P1 may further include a first drive pulse P1 having a stable stationary position at a first angle at which the rotor rotation angle from the reference position is 90 degrees or less, and a second drive pulse P1 having a stable stationary position at a second angle at which the rotor rotation angle from the reference position is larger than the first angle and 90 degrees or less, and the drive pulse P2 may further include a first drive pulse P2 having a stable stationary position at a third angle at which the rotor rotation angle from the reference position is 90 degrees or more, and a second drive pulse P2 having a stable stationary position at a fourth angle at which the rotor rotation angle from the reference position is larger than the third angle and 90 degrees or more.

According to another embodiment of the present disclosure, there is provided a timepiece including a pointer; a two-phase stepping motor including a rotor magnetized in two poles and a stator in which a two-phase coil is wound around a yoke, and moving the pointer; and a pulse generation circuit applying a drive pulse for rotating the rotor to the two-phase stepping motor. The drive pulse is constituted of a drive pulse P1 and a drive pulse P2. The pulse generation circuit applies the drive pulse P1 having a stable stationary position at which a rotor rotation angle from a reference position is 90 degrees or less and applies the drive pulse P2 having a stable stationary position at which the rotor rotation angle from the reference position is 90 degrees or more continuously to the application of the drive pulse P1.

According to still another embodiment of the present disclosure, there is provided a motor control method in a pulse generation circuit applying a drive pulse for rotating a rotor to a two-phase stepping motor including the rotor magnetized in two poles and a stator in which a two-phase coil is wound around a yoke, the method including applying a drive pulse P1 having a stable stationary position at which a rotor rotation angle from a reference position by the pulse generation circuit is 90 degrees or less, and applying a drive pulse P2 having a stable stationary position at which the rotor rotation angle from the reference position is 90 degrees or more by the pulse generation circuit continuously to the application of the drive pulse P1.

BRIEF DESCRIPTION OF THE DRAWINGS

FIG. 5 is a table which is obtained by summarizing a voltage level applied to a terminal of a first coil and a terminal of a second coil, and polarities of a first magnetic pole portion, a second magnetic pole portion, and a third magnetic pole portion when applying each of the drive pulses.

FIG. 6 is a view for explaining a torque generation region of the drive pulse used in the embodiment.

FIG. 7 is a graph illustrating a relationship between a rotor rotation angle and a torque.

FIG. 8 is a table illustrating a torque generation direction of the drive pulse used in the embodiment.

FIG. 16 is a table illustrating a combination of a drive pulse P1, a drive pulse P2, and a waiting period according to the second embodiment.

FIG. 18 is a table illustrating a combination of a drive pulse P1, a drive pulse P2, and a waiting period according to the third embodiment.

FIG. 19 is a graph illustrating a relationship between a ratio (P1/P2) of a drive pulse P1 and a drive pulse P2, and a maximum operation voltage, and a relationship between the ratio (P1/P2) of the drive pulse P1 and the drive pulse P2, and a minimum operation voltage.

FIG. 20 is a table illustrating a drive pulse P1 ratio, a drive pulse P2 ratio, P1/P2, a maximum operation voltage, a minimum operation voltage, and a difference between the maximum operation voltage and the minimum operation voltage.

DETAILED DESCRIPTION OF THE PREFERRED EMBODIMENTS

Figure 1:
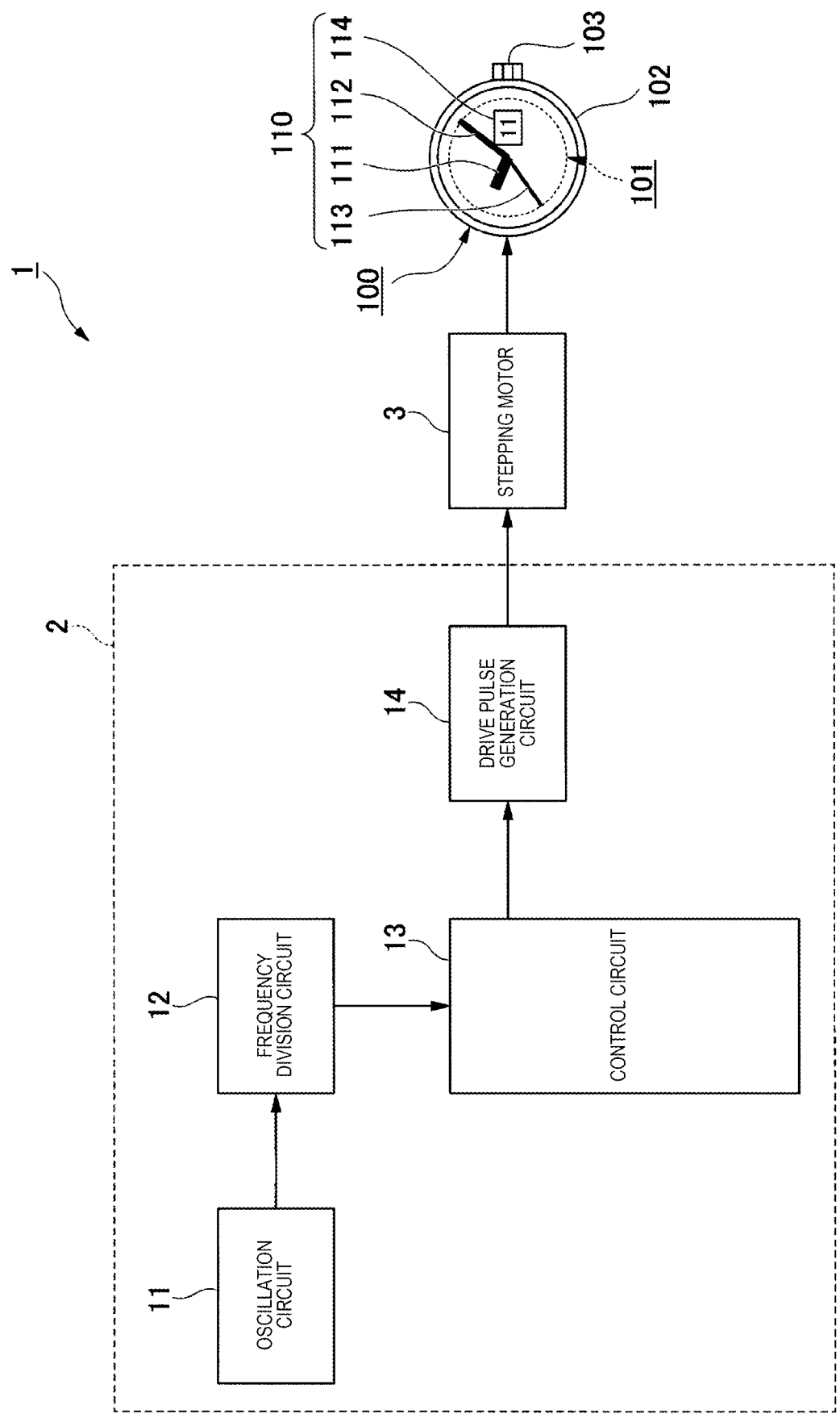
FIG. 1 is a block diagram illustrating an analog electronic timepiece according to a first embodiment.

Hereinafter, embodiments of the present disclosure will be described with reference to the drawings. Moreover, in the drawings used for the following description, a scale of each member is appropriately changed in order to make each member have a recognizable size.

First Embodiment

Configuration Example of Analog Electronic Timepiece 1

FIG. 1 is a block diagram illustrating an analog electronic timepiece 1 according to an embodiment.

As illustrated in FIG. 1, the analog electronic timepiece 1 includes a control unit 2, a stepping motor 3, an analog display unit 100, a timepiece movement 101, a timepiece case 102, and a crown 103.

The control unit 2 includes an oscillation circuit 11, a frequency division circuit 12, a control circuit 13, and a drive pulse generation circuit 14.

The analog display unit 100 includes an hour hand 111, a minute hand 112, a second hand 113, and a calendar display unit 114 for date display. Moreover, in the following description, in a case where one of the hour hand 111, the minute hand 112, the second hand 113, and the calendar display unit 114 for the date display is not specified, it is referred to as a pointer 110.

The analog display unit 100 is disposed on an outer surface side of the timepiece case 102. In addition, the timepiece movement 101 including a train wheel (not illustrated) is disposed on an inside of the timepiece case 102.

The oscillation circuit 11 generates a signal of a predetermined frequency.

The frequency division circuit 12 frequency-divides a signal generated by the oscillation circuit 11 to generate a timepiece signal as a reference of the timepiece.

The control circuit 13 controls each electronic circuit element constituting the analog electronic timepiece 1, and controls a pulse signal for driving a motor to rotate.

The drive pulse generation circuit 14 generates a drive pulse signal for driving the motor to rotate based on a control signal output by the control unit 13, and outputs the generated pulse signal to the stepping motor 3.

The stepping motor 3 is driven to rotate by the drive pulse signal output by the drive pulse generation circuit 14. The pointer 110 is operated by the rotation of the stepping motor 3 via the train wheel.

The stepping motor 3 is a two-phase stepping motor. The stepping motor 3 includes a stator 20, a first yoke 22, a pair of second yokes 23 and 24, a rotor 30, a first coil 50A, and a second coil 50B.

Configuration Example of Stepping Motor 3

Next, a configuration example of the stepping motor 3 will be described.

Figure 2:
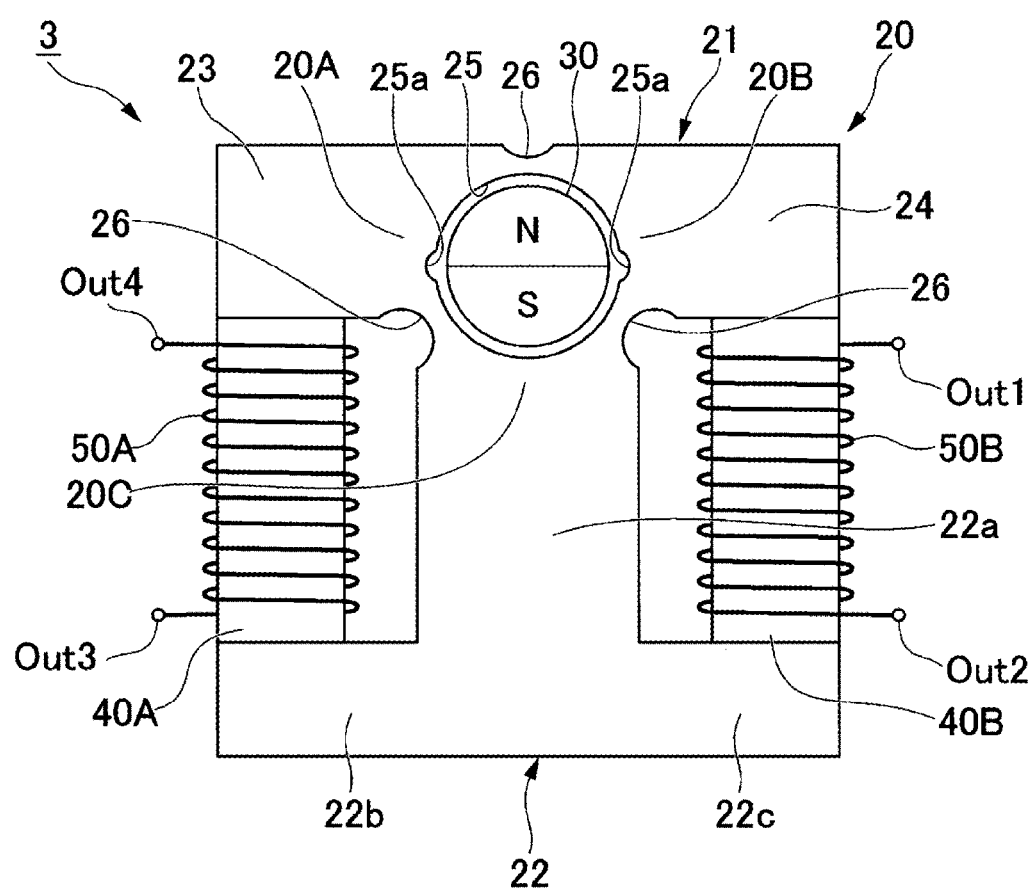
FIG. 2 is a schematic view of a stepping motor according to the first embodiment.

FIG. 2 is a schematic view of the stepping motor 3 according to the embodiment.

As illustrated in FIG. 2, the stepping motor 3 includes the stator 20 having a rotor accommodation hole 25, and the rotor 30. The rotor 30 has a magnetic polarity by being magnetized to two poles in a radial direction, and is rotatably disposed in the rotor accommodation hole 25. The stepping motor 3 operates for every unit step. The stepping motor 3 rotates the hour hand 111, the minute hand 112, the second hand 113, and the calendar display unit 114 for the date display via the train wheel.

The stator 20 includes a stator main body 21, a first magnetic core 40A and a second magnetic core 40B electrically coupled to the stator main body 21, and a first coil 50A and a second coil 50B wound around the respective magnetic cores 40A and 40B.

The stator main body 21 is formed of, for example, a plate material using a high magnetic permeability material such as permalloy. The stator main body 21 includes the first yoke 22 and the second, yokes 23 and 24. The first yoke 22 has a T-shape and includes, a straight portion 22a extending in a predetermined first direction, and a pair of overhang portions 22b and 22c. The pair of overhang portions 22b and 22c extends from one end portion of the straight portion 22a to both sides in a second direction orthogonal to the first direction. The second yokes 23 and 24 extend from the other end portion of the straight portion 22a to both sides in the second direction. The stator main body 21 constituted of the first yoke 22 and the second yokes 23 and 24 is formed in an H shape in a plan view. The first yoke 22 and the second yokes 23 and 24 are integrally formed. The overhang portion 22b of the first yoke 22 and the second yoke 23 extend from the straight portion 22a in a same direction. The overhang portion 22c of the first yoke 22 and the second yoke 24 extend from the straight portion 22a in a same direction.

The rotor accommodation hole 25 having a circular hole shape is formed at an intersection of the first yoke 22 and the second yokes 23 and 24 of the stator main body 21. A pair of cutouts 25a is formed on an inner peripheral surface of the rotor accommodation hole 25. The pair of cutouts 25a is formed to be opposite to each other in the second direction. Each of the pair of cutouts 25a is cut out in an arc shape. The cutouts 25a are configured as positioning portions for determining a stop position of the rotor 30. The rotor 30 has a lowest potential energy and stably stops when a magnetic pole axis is located at a position orthogonal to a line segment connecting the pair of cutouts 25a, that is, the magnetic pole axis is located at a position along the first direction. Hereinafter, the stop position (position illustrated in FIG. 2) of the rotor 30 when the magnetic pole axis of the rotor 30 is along the first direction, and a S pole of the rotor 30 faces a first yoke 22 side is referred to as a first stop position. The position is also referred to as a reference position. In addition, the stop position of the rotor 30 when the magnetic pole axis of the rotor 30 is along the first direction and a N pole of the rotor 30 faces the first yoke 22 side is referred to as a second stop position.

In addition, in the stator main body 21, three cutouts 26 are formed in a periphery of the rotor accommodation hole 25. Each of the cutouts 26 is cut out from an outer peripheral edge of the stator main body 21 toward the rotor accommodation hole 25 in a plan view. The cutouts 26 are formed at a corner portion where the first yoke and the second yoke 23 are connected, a corner portion where the first yoke 22 and the second yoke 24 are connected, and a corner portion where the second yoke 23 and the second yoke 24 are connected. Each of the cutouts 26 is cut out in an arc shape.

In the stator main body 21, narrow portions locally narrowed by the respective cutouts 26 are provided in the periphery of the rotor accommodation hole 25. The narrow portions are susceptible to magnetic saturation. The narrow portions are magnetically saturated, so that the stator main body 21 is magnetically divided into three in the periphery of the rotor accommodation hole 25. The stator main body 21 has a first magnetic pole portion 20A, a second magnetic pole portion 20B, and a third magnetic pole portion 20C. The first magnetic pole portion 20A is disposed at a position corresponding to the second yoke 23 in the periphery of the rotor 30. The second magnetic pole portion 20B is disposed at a position corresponding to the second yoke 24 in the periphery of the rotor 30. The third magnetic pole portion 20C is disposed at a position corresponding to the straight portion 22a of the first yoke 22 in the periphery of the rotor 30. The first magnetic pole portion 20A and the second magnetic pole portion 20B are disposed to face the N pole (S pole of the rotor 30 located at the second stop position) of the rotor 30 located at the first stop position. The third magnetic pole portion 20C is disposed to face the S pole (N pole of the rotor 30 located at the second stop position) of the rotor 30 located at the first stop position.

The first coil 50A is wound around the first magnetic core 40A, and is magnetically coupled to the first magnetic pole portion 20A and the third magnetic pole portion 20C. The first coil 50A has a first terminal Out3 and a second terminal Out4. The first coil 50A is wound, so that when a current flows from the second terminal Out4 to the first terminal Out3, a magnetic field from an overhang portion 22b side to a second yoke 23 side generates in the first coil 50A.

The second coil 50B is wound around the second magnetic core 40B, and is magnetically coupled to the second magnetic pole portion 20B and the third magnetic pole portion 20C. The second coil 50B has a first terminal Out1 and a second terminal Out2. The second coil 50B is wound, so that when a current flows from the first terminal Out1 to the second terminal Out2, a magnetic field from an overhang portion 22c side to a second yoke 24 side generates in the second coil 50B.

A wire diameter of a conducting wire of the first coil 50A and a wire diameter of a conducting wire of the second coil 50B are equal to each other. The number of windings of the first coil 50A and the number of windings of the second coil 50B are equal to each other. Terminals of the first coil 50A and the second coil 50B are connected to the drive pulse generation circuit 14. In the following description, a potential of the second terminal Out4 of the first 50A is V4, a potential, of the first terminal Out3 of the first coil 50A is V3, a potential of the second terminal Out2 of the second coil 50B is V2, and a potential of the first terminal Out1 of the second coil 50B is V1.

In the stator 20 having such a configuration, when a magnetic flux is generated from the first coil 50A and the second coil 50B, the magnetic flux flows along each of the magnetic cores 40A and 40B, and the stator main body 21. The polarities of the first magnetic pole portion 20A, the second magnetic pole portion 20B, and the third magnetic pole portion 20C are switched according to a state of energization of each of the coils 50A and 50B.

Relationship Between Drive Pulse To Be Applied and Stationary Position of Rotor

Figure 3:
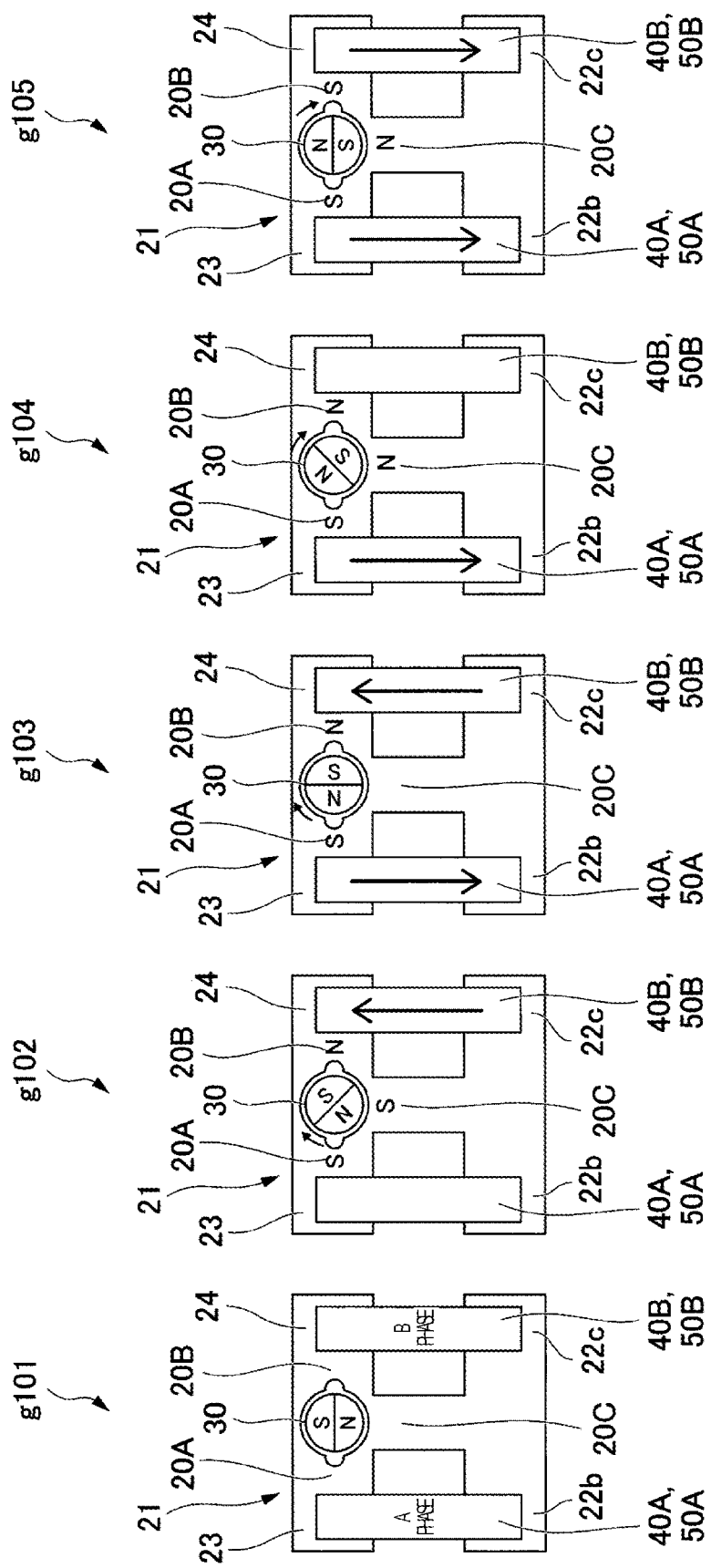
FIG. 3 is a view illustrating a relationship between a magnetic field generated in a case where various drive pulses are applied to a stepping motor and a stop position of a rotor.
Figure 4:
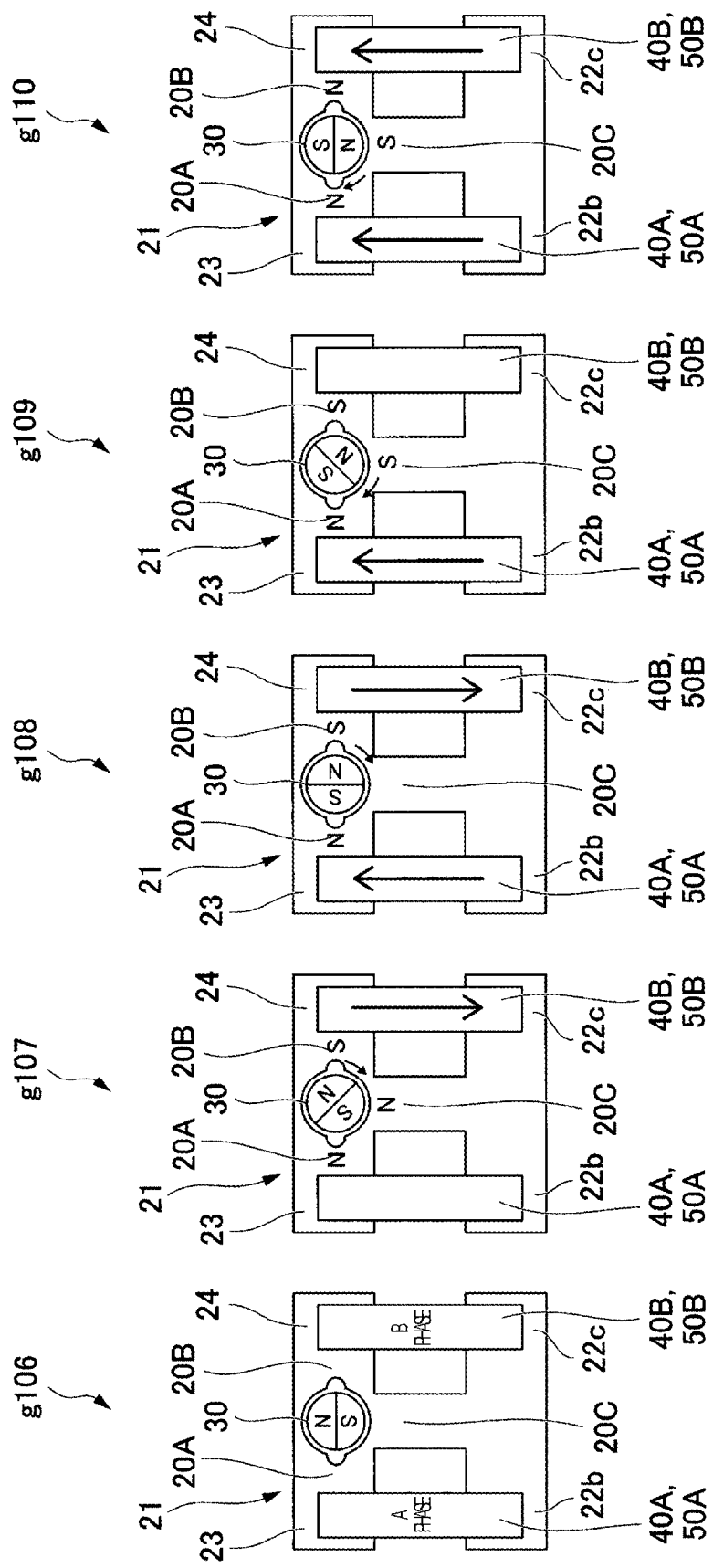
FIG. 4 is a view illustrating a relationship between the magnetic field generated in a case where various drive pulses are applied to the stepping motor and the stop position of the rotor.

A relationship between the magnetic field generated in a case where various drive pulses are applied to the stepping motor 3 and a stop position of the rotor 30 will be described with reference to FIGS. 3 and 4. FIGS. 3 and 4 are views illustrating the relationship between the magnetic field generated in a case where various drive pulses are applied to the stepping motor 3 and the stop position of the rotor 30. Moreover, in FIGS. 3 and 4, the stepping motor 3 is illustrated in a strap manner only for components necessary for the explanation.

Symbol g101 represents a state where no current flows through the first coil 50A and the second coil 50B. Since no magnetic field is generated in the magnetic cores 40A and 40B, the rotor 30 is in a state of stopping at the first stop position and a rotation angle is 0 degrees.

Symbol g102 represents a state where the drive pulse generation circuit 14 applies the drive pulse to the coil 50B. In the stepping motor 3 indicated by the symbol g102, the voltage V1 applied to the first terminal Out1 of the second coil 50B is H (high level), and the voltage V2 applied to the second terminal Out2 of the second coil 50B is L (low level). In addition, in the stepping motor 3 indicated by the symbol g102, the voltage V3 applied to the first terminal Out3 of first coil 50A is L, and the voltage V4 applied to the second terminal Out4 of the first coil 50A is L. In the following description, such a drive pulse is referred to as a drive pulse of 45 degrees.

A magnetic field directed from the overhang portion 22c side to the second yoke 24 side is generated in the second coil 50B by the application of the drive pulse of 45 degrees. Therefore, the second magnetic pole portion 20B is excited to the N pole, and the first magnetic pole portion 20A and the third magnetic pole portion 20C are excited to the S pole. As a result, the S pole of the rotor 30 is pulled with the N pole of the second magnetic pole portion 20B, and the rotor 30 has a stable stationary position at an angle of 45 degrees in a positive direction. Moreover, the stable stationary position may be changed by substantially 15 to 75 degrees depending on a stator design. The rotor 30 may rotate to a position exceeding the stable stationary depending on the magnitude of the drive voltage or the load, but in a case where the rotor 30 exceeds the stable stationary position, a torque acts as a brake.

In the embodiment, in a case where a non-excitation state or an excitation state (drive pulse) is continued, a position at which the rotor 30 is magnetically stably stopped is referred to as the stable stationary position.

Symbol g103 represents a state where the drive pulse generation circuit 14 further applies the drive pulse to the first coil 50A of the stepping motor 3 in the state of the symbol g102. In the stepping motor 3 indicated by the symbol g103, the voltage V3 applied to the first terminal Out3 of the first coil 50A is H, and the voltage V4 applied to the second terminal Out4 of the first coil 50A is L. In the following description, such a drive pulse is referred to as a drive pulse of 90 degrees.

A magnetic field directed from the overhang portion 22c side to the second yoke 24 side is generated in the second coil 50B and a magnetic field directed from the second yoke 23 side to the overhang portion 22b side is generated in the first coil 50A by the application of the drive pulse of 90 degrees. Therefore, the second magnetic pole portion 20B is excited to the N pole, and the first magnetic pole portion 20A is excited to the S pole. As a result, the S pole of the rotor 30 is pulled with the N pole of the second magnetic pole portion 20B, the N pole of the rotor 30 is pulled with the S pole of the first magnetic pole portion 20A, and the rotor 30 has a stable stationary position at an angle of 90 degrees in the positive direction. The rotor 30 may rotate to a position exceeding the stable stationary position depending on the magnitude of the drive voltage or the load, but in a case where the rotor 30 exceeds the stable stationary position, the torque acts as the brake.

Symbol g104 represents a state where the drive pulse applied to the coil 50B of the stepping motor 3 in the state of the symbol g103 is stopped. In the following explanation, such a drive pulse is referred to as a drive pulse of 135 degrees.

A magnetic field directed from the second yoke 23 side to the overhang portion 22b side is generated in the first coil 50A by the application of the drive pulse of 135 degrees. Therefore, the second magnetic pole portion 20B and the third magnetic pole portion 20C are excited to the N pole, and the first magnetic pole portion 20A is excited to the S pole. As a result, the S pole of the rotor 30 is pulled with the N pole of the third magnetic pole portion 20C, and the rotor 30 has a stable stationary position at an angle of 135 degrees in the positive direction. The stable stationary position may be changed by substantially ±15 degrees with respect to 135 degrees depending on the stator design. The rotor 30 may rotate to a position exceeding the stable stationary position depending on the magnitude of the drive voltage or the load, but in a case where the rotor 30 exceeds the stable stationary position, the torque acts as the brake.

Symbol g105 represents a state where the drive pulse generation circuit 14 applies the drive pulse again to the coil 50B of the stepping motor 3 in the state of the symbol g104. In the stepping motor 3 indicated by the symbol g105, the voltage V4 applied to the first terminal Out1 of the second coil 50B is L, and the voltage V2 applied to the second terminal Out2 of the second coil 50B is H. In the following explanation, such a drive pulse is referred to as a drive pulse of 180 degrees.

A magnetic field directed from the second yoke 23 side to the overhang portion 22b side is generated in the first coil 50A and a magnetic field directed from the second yoke 24 side to the overhang portion 22c side is generated in the second coil 50B by the application of the drive pulse of 180 degrees. Therefore, the third magnetic pole portion 20C is excited to the N pole, and the first magnetic pole portion 20A and the second magnetic pole portion 20B are excited to the S pole. As a result, the S pole of the rotor 30 is pulled with the N pole of the third magnetic pole portion 20C, the N pole of the rotor 30 is pulled with the S pole of the first magnetic pole portion 20A and the S pole of the second magnetic pole portion 20B, and the rotor 30 has a stable stationary position that is the second stop position at an angle of 180 degrees in the positive direction. The rotor 30 may rotate to a position exceeding the stable stationary position depending on the magnitude of the drive voltage or the load, but in a case where the rotor 30 exceeds the stable stationary position, the torque acts as the brake.

Explanation will be continued with reference to FIG. 4.

Symbol g106 represents a state where the rotor 30 stops at the second stop position at the angle of 180 degrees in the positive direction.

Symbol g107 represents a state where the drive pulse generation circuit 14 applies the drive pulse to the coil 50B. In the stepping motor 3 indicated by the symbol g107, the voltage V1 applied to the first terminal Out1 of the second coil 50B is L, and the voltage V2 applied to the second terminal Out2 of the second coil 50B is H. In the following explanation, such a drive pulse is referred to as a drive pulse of 225 degrees.

A magnetic field directed from the second yoke 24 side to the overhang portion 22c side is generated in the second coil 50B by the application of the drive pulse of 225 degrees. Therefore, the second magnetic pole portion 20B is excited to the S pole, and the first magnetic pole portion 20A and the third magnetic pole portion 20C are excited to the N pole. As a result, the S pole of the rotor 30 is pulled with the N poles of the first magnetic pole portion 20A and the third magnetic pole portion 20C, the N pole of the rotor 30 is pulled with the S pole of the second magnetic pole portion 20B, and the rotor 30 has a stable stationary position at an angle of 225 degrees in the positive direction. Moreover, the stable stationary position may be changed by substantially ±15 degrees with respect to 225 degrees depending on the stator design. The rotor 30 may rotate to a position exceeding the stable stationary position depending on the magnitude of the drive voltage or the load, but in a case where the rotor 30 exceeds the stable stationary position, the torque acts as the brake.

Symbol g108 represents a state where the drive pulse generation circuit 14 further applies the drive pulse to the first coil 50A of the stepping motor 3 in the state of the symbol g107. In the stepping motor 3 indicated by the symbol g108, the voltage V3 applied to the first terminal Out3 of the first coil 50A is L, and the voltage V4 applied to the second terminal Out4 is H. In the following explanation, such a drive pulse is referred to as a drive pulse of 270 degrees.

A magnetic field directed from the second yoke 24 side to the overhang portion 22c side is generated in the second coil 50B and a magnetic field directed from the overhang portion 22b side to the second yoke 23 side is generated in the first coil 50A by the application of the drive pulse of 270 degrees. Therefore, the first magnetic pole portion 20A is excited to the S pole, and the second magnetic pole portion 20B is excited to the N pole. As a result, the S pole of the rotor 30 is pulled with the N pole of the first magnetic pole portion 20A, the N pole of the rotor 30 is pulled with the S pole of the second magnetic pole portion 20B, and the rotor 30 has a stable stationary position at an angle of 270 degrees in the positive direction. The rotor 30 may rotate to a position exceeding the stable stationary position depending on the magnitude of the drive voltage or the load, but in a case where the rotor 30 exceeds the stable stationary position, the torque acts as the brake.

Symbol g109 represents a state where the drive pulse applied to the coil 50B of the stepping motor 3 in the state of the symbol g108 is stopped. In the following explanation, such a drive pulse is referred to as a drive pulse of 315 degrees.

A magnetic field directed from the overhang portion 22b side to the second yoke 23 side is generated in the first coil 50A by the application of the drive pulse of 315 degrees. Therefore, the second magnetic pole portion 20B and the third magnetic pole portion 20C are excited to the S pole, and the first magnetic pole portion 20A is excited to the N pole. As a result, the N pole of the rotor 30 is pulled with the S poles of the second magnetic pole portion 20B and the third magnetic pole portion 20C, and the rotor 30 has a stable stationary position at an angle of 315 degrees in the positive direction. Moreover, the stable stationary position may be changed by substantially ±15 degrees with respect to 315 degrees depending on the stator design. The rotor 30 may rotate to a position exceeding the stable stationary position depending on the magnitude of the drive voltage or the load, but in a case where the rotor 30 exceeds the stable stationary position, the torque acts as the brake.

Symbol g110 represents a state where the drive pulse generation circuit 14 applies the drive pulse again to the coil 50B of the stepping motor 3 in the state of the symbol g109. In the stepping motor 3 indicated by the symbol g110, the voltage V4 applied to the first terminal Out1 of the second coil 50B is H, and the voltage V2 applied to the second terminal Out2 of the second coil 50B is L. In the following explanation, such a drive pulse is referred to as a drive pulse of 0 degrees.

A magnetic field directed from the overhang portion 22b side to the second yoke 23 side is generated in the first coil 50A and a magnetic field directed from the overhang portion 22c side to the second yoke 24 side is generated in the second coil 50B by the application of the drive pulse of 0 degrees. Therefore, the third magnetic pole portion 20C is excited to the S pole, and the first magnetic pole portion 20A and the second magnetic pole portion 20B are excited to the N pole. As a result, the N pole of the rotor 30 is pulled with the S pole of the third magnetic pole portion 20C, the S pole of the rotor 30 is pulled with the N poles of the first magnetic pole portion 20A and the second magnetic pole portion 20B, and the rotor 30 has a stable stationary position at an angle of 0 degrees (360 degrees) in the positive direction. The rotor 30 may rotate to a position exceeding the stable stationary position depending on the magnitude of the drive voltage or the load, but in a case where the rotor 30 exceeds the stable stationary position, the torque acts as the brake.

The relationships illustrated in FIGS. 3 and 4 can be summarized as illustrated in FIG. 5. FIG. 5 is a table which is obtained by summarizing a voltage level applied to the terminal of the first coil 50A and the terminal of the second coil 50B, and the polarities of the first magnetic pole portion 20A, the second magnetic pole portion 20B, and the third magnetic pole portion 20C when applying each of the drive pulses.

Torque Generation Region of Drive Pulse Used in the Embodiment

Next, a torque generation region of the drive pulse used in the embodiment will be described with reference to FIGS. 6 to 8.

FIG. 6 is a view for explaining the torque generation region of the drive pulse used in the embodiment. In FIG. 6, symbol g151 and symbol 1A represent line segments connecting the pair cutouts 25a, and the angle is 0 degrees. Symbol g152 and symbol 1B represent the torque generation region in a case where the drive pulse that causes the rotor 30 to rotate 45 degrees is applied. The symbol g152 represents the torque generation region in a case where the drive pulse that causes the rotor 30 to rotate 135 degrees is applied.

FIG. 7 is a graph illustrating a relationship between a rotor rotation angle and a torque. In FIG. 7, a horizontal axis is the rotor rotation angle [degree] and a vertical axis is the torque [µNm]. Symbol g161 is a torque characteristic in a case where the drive pulse that causes the rotor 30 to rotate 45 degrees is applied. Symbol g162 is a torque characteristic in a case where the drive pulse that causes the rotor 30 to rotate 135 degrees is applied.

FIG. 8 is a table illustrating a torque generation direction of the drive pulse used in the embodiment. In FIG. 8, symbol 1A corresponds to the symbol 1A in FIG. 6, and corresponds to the torque characteristic of the symbol g161 in FIG. 7. Symbol 1B corresponds to the symbol 1B in FIG. 6, and corresponds to the torque characteristic of the symbol g162 in FIG. 7.

In the polarity of the torque when the rotor rotation angle rotates from 0 degrees to 45 degrees, as illustrated in FIG. 8, the case of 1A is the positive direction and the case of 1B is the positive direction. In addition, a case of no excitation is the negative direction.

In the polarity of the torque when the rotor rotation angle rotates from 45 degrees to 90 degrees in the positive direction, as illustrated in FIG. 8, the case of 1A is the negative direction and the case of 1B is the positive direction. In addition, the case of no excitation is the negative direction.

In the polarity of the torque when the rotor rotation angle rotates from 90 degrees to 135 degrees in the positive direction, as illustrated in FIG. 8, the case of 1A is the negative direction and the case of 1B is the positive direction. In addition, the case of no excitation is the positive direction.

In the polarity of the torque when the rotor rotation angle rotates from 135 degrees to 180 degrees in the positive direction, as illustrated in FIG. 8, the case of 1A is the negative direction and the case of 1B is the negative direction. In addition, the case of no excitation is the positive direction.

Here, the positive direction of the torque generation direction means that the torque to be rotated in the positive direction is generated. The negative direction of the torque generation direction means that the torque to be rotated back is generated. Moreover, a switching position from positive to negative in FIG. 7 is the stable stationary position.

Drive Pulse During the Forward Rotation of the Embodiment

Next, a drive pulse during the forward rotation of the embodiment will be described with reference to FIGS. 9 to 11.

Figure 9:
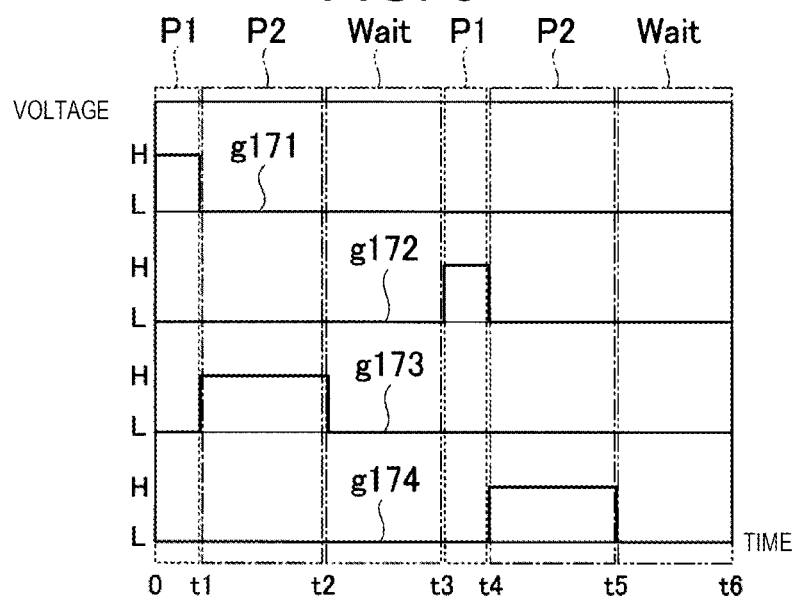
FIG. 9 is a graph illustrating a drive pulse waveform during the forward rotation according to the first embodiment.

FIG. 9 is a graph illustrating a drive pulse waveform during the forward rotation according to the embodiment. In FIG. 9, a horizontal axis represents time and a vertical axis represents a voltage. H means the high level and L means the low level. H is, for example, 3 V and L is, for example, 0 V. Symbol g171 is a drive pulse applied to the first terminal Out1 of the second coil 50B. Symbol g172 is a drive pulse applied to the second terminal Out2 of the second coil 50B. Symbol g173 is a drive pulse applied to the first terminal Out3 of the first coil 50A. Symbol g174 is a drive pulse applied to the second terminal Out4 of the first coil 50A.

Figure 10:
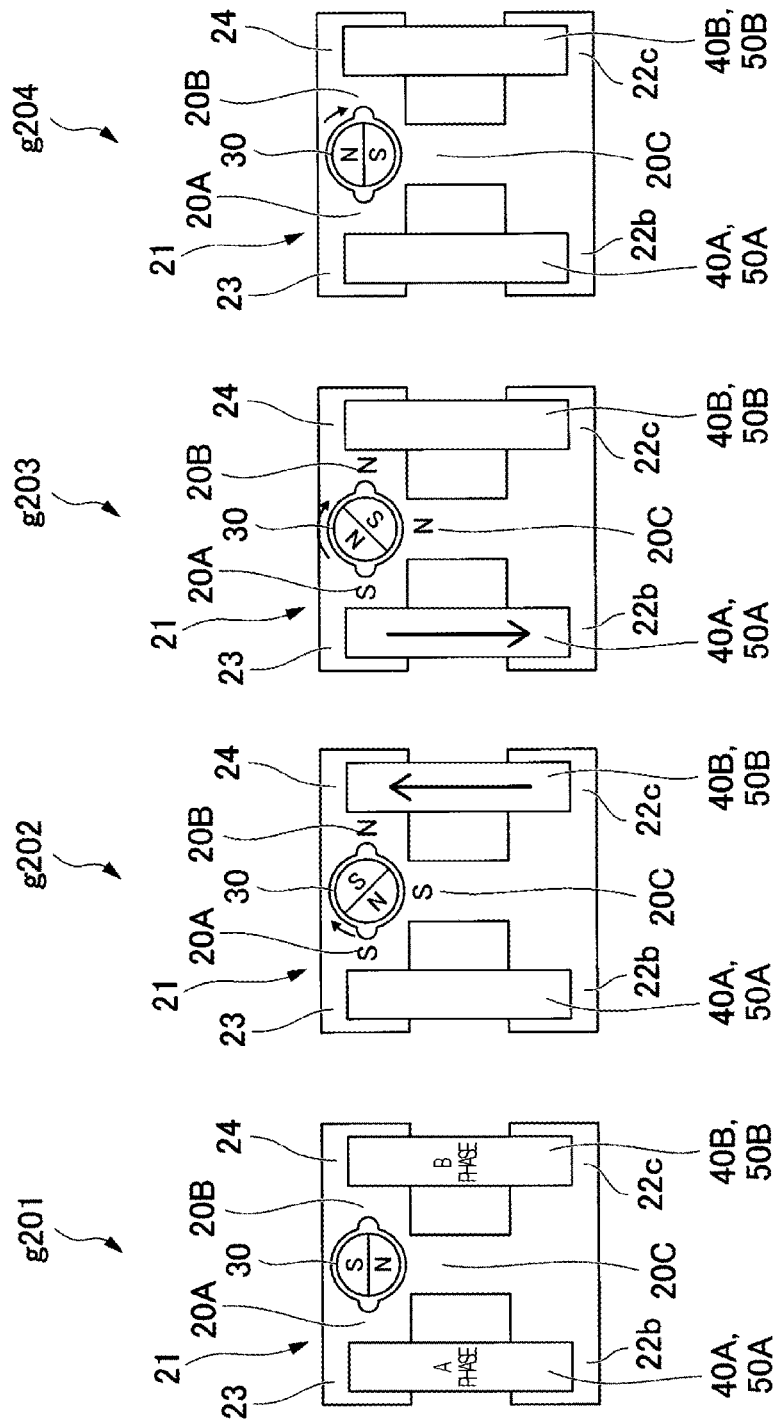
FIG. 10 is a view illustrating a state of a stepping motor according to the first embodiment when applying a drive pulse in a forward rotation direction.
Figure 11:
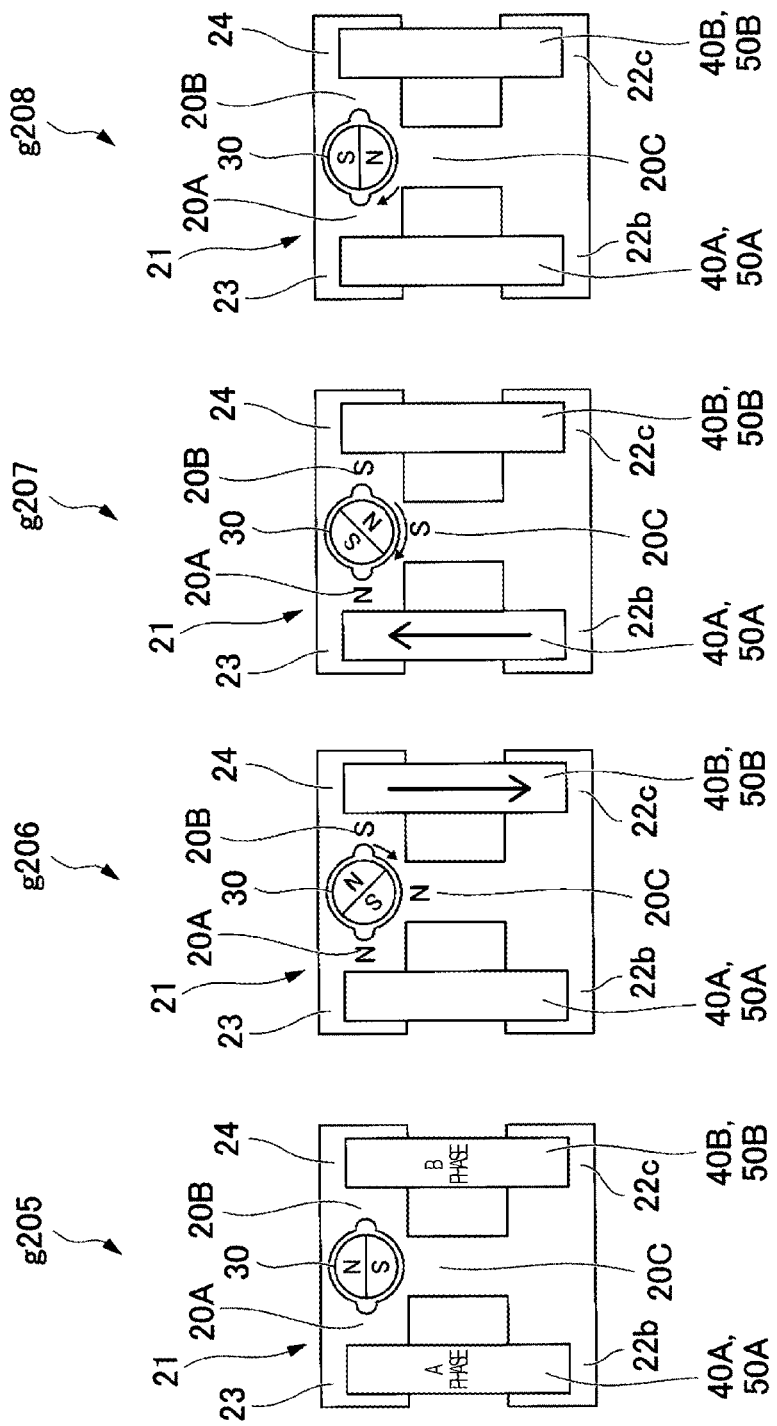
FIG. 11 is a view illustrating a state of the stepping motor according to the first embodiment when applying the drive pulse in the forward rotation direction.

FIGS. 10 and 11 are views illustrating a state of the stepping motor 3 according to the embodiment when applying the drive pulse in the forward rotation direction.

First, rotation of 0 to 180 degrees will be described.

Symbol g201 in FIG. 10 represents a state where the drive pulse is not applied to the first coil 50A and the second coil 50B, and the motor 3 is stopped. The rotation angle of the rotor 30 in this case is 0 degrees.

(Step S1) During a period of time 0 to t1, the drive pulse generation circuit 14 applies the drive pulse of 45 degrees to the stepping motor 3 as a drive pulse P1 (first pulse). That is, as represented by the symbol g171 and the symbol g172 in FIG. 9, the drive pulse generation circuit 14 applies H to the first terminal Out1 of the second coil 50B, and applies L to the second terminal Out2 of the second coil 50B. In addition, as represented by the symbol g173 and the symbol g174, the drive pulse generation circuit 14 applies L to the first terminal Out3 and the second terminal Out4 of the first coil 50A. The period of the drive pulse P1 is substantially 0.75 ms.

As a result of applying the drive pulse P1, as represented by symbol g202 in FIG. 10, the magnetic field is generated and the rotor 30 starts rotation in the positive direction (clockwise). In a case where the rotor 30 exceeds the stable stationary position of the drive pulse of 45 degrees depending on the magnitude of the drive voltage or the load, the torque acts as the brake.

(Step S2) Subsequently, during a period of time t1 to t2, the drive pulse generation circuit 14 applies the drive pulse of 135 degrees to the stepping motor 3 as a drive pulse P2 (second pulse). That is, as represented by the symbol g171 and the symbol g172 in FIG. 9, the drive pulse generation circuit 14 applies L to the first terminal Out1 and the second terminal Out2 of the second coil 50B. In addition, as represented by the symbol g173 and the symbol g174, the drive pulse generation circuit 14 applies H to the first terminal Out3 of the first coil 50A, and applies L to the second terminal Out4 of the first coil 50A. The period of the drive pulse P2 is substantially 2.25 ms.

As a result of applying the drive pulse P2, as represented by symbol g203 in FIG. 10, the magnetic field is generated, and the rotor 30 continues the rotation in the positive direction and rotates 90 degrees or more.

(Step S3) Subsequently, during a period of time t2 to t3, the drive pulse generation circuit 14 provides a waiting period (Wait). In the waiting period, as represented by the symbol g171 and the symbol g172 in FIG. 9, the drive pulse generation circuit 14 applies L to the first terminal Out1 and the second terminal Out2 of the second coil 50B. In addition, as represented by the symbol g173 and the symbol g174, the drive pulse generation circuit 14 applies L to the first terminal Out3 and the second terminal Out4 of the first coil 50A. That is, the waiting period is a period in which the application of the pulse is stopped. The waiting period is substantially 0.5 to 2 ms.

As represented by the symbol g204 in FIG. 10, the rotor 30 is rotated by inertia from a rotation position of 135 degrees to a rotation position of 180 degrees which is a stable stationary position (second stop position), and is stopped at the stable stationary position of the non-excitation state by the waiting period.

Next, rotation of 180 to 0 degrees will be described.

Symbol g205 in FIG. 11 represents a state where the drive pulse is not applied to the first coil 50A and the second cod 50B, and the motor 3 is stopped. In this case, the rotation angle of the rotor 30 is 180 degrees.

(Step S4) Subsequently, during a period of time t3 to t4, the drive pulse generation circuit 14 applies the drive pulse of 225 degrees to the stepping motor 3 as the drive pulse P1. That is, as represented by the symbol g171 and the symbol g172 in FIG. 9, the drive, pulse generation circuit 14 applies L to the first terminal Out1 of the second coil 50B, and applies H to the second terminal Out2 of the second coil 50B. In addition, as represented by the symbol g173 and the symbol g174, the drive pulse generation circuit 14 applies L to the first terminal Out3 and the second terminal Out4 of the first coil 50A. The period of the drive pulse P1 is substantially 0.75 ms.

As a result of applying the drive pulse P1, as represented by symbol g206 in FIG. 11, the magnetic field is generated, and the rotor 30 starts the rotation in the positive direction. In a case where the rotor 30 exceeds the stable stationary position of the drive pulse of 225 degrees depending on the magnitude of the drive voltage or the load, the torque acts as the brake.

(Step S) Subsequently, during a period of time t4 to t5, the drive pulse generation circuit 14 applies the drive pulse of 315 degrees to the stepping motor 3 as the drive pulse P2. That is, as represented by the symbol g171 and the symbol g172 in FIG. 9, the drive pulse generation circuit 14 applies L to the first terminal Out1 and the second terminal Out2 of the second coil 50B. In addition, as represented by the symbol g173 and the symbol g174, the drive pulse generation circuit 14 applies L to the first terminal Out3 of the first coil 50A, and applies H to the second terminal Out4 of the first coil 50A. The period of the drive pulse P2 is substantially 2.25 ms.

As a result of applying the drive pulse P2, as represented by symbol g207 in FIG. 11, the magnetic field is generated and the rotor 30 continues the rotation in the positive direction, and rotates 90 degrees or more.

(Step S6) Subsequently, during a period of time t5 to t6, the drive pulse generation circuit 14 provides a waiting period. In the waiting period, as represented by the symbol g171 and the symbol g172, the drive pulse generation circuit 14 applies L to the first terminal Out1 and the second terminal Out2 of the second coil 50B. In addition, as represented by the symbol g173 and the symbol g174, the drive pulse generation circuit 14 applies L to the first terminal Out3 and the second terminal Out4 of the first coil 50A. The waiting period is substantially 0.5 to 2 ms.

As represented by the symbol g208 in FIG. 11, the rotor 30 is rotated by inertia from the rotation position of 315 degrees to the rotation position of 0 degrees which is the stable stationary position (first stop position), and is stopped at the stable stationary position of the non-excitation state by the waiting period.

As described above, in the embodiment, when the rotor 30 rotates forward, the drive pulse is applied in the order of the drive pulse P1 of 45 degrees, the drive pulse P2 of 135 degrees, the waiting period, the drive pulse P1 of 225 degrees, the drive pulse P2 of 315 degrees, and the waiting period.

In addition, in the embodiment, the process from time0 to t3 and the process from time t3 to t6 are referred to as 1Step. The 1Step includes the drive pulse P1, the drive pulse P2, and the waiting period.

As described above, in the embodiment, the drive pulse P1 used during the forward rotation of the rotor 30 is the drive pulse of 45 degrees or 225 degrees among the drive pulses described with reference to FIGS. 3 to 8. In addition, the drive pulse P2 used during the forward rotation of the rotor 30 is the drive pulse of 135 degrees or 315 degrees among the drive pulses described with reference to FIGS. 3 to 8. That is, in the embodiment, during the forward rotation of the rotor 30, first, the rotor 30 rotates 45 degrees from the reference position (0 degrees), and applies the drive pulse P1 which is the first pulse having the stable stationary position at 90 degrees or less to the stepping motor 3. In the embodiment, during the forward rotation, continuously to the drive pulse P1, the rotor 30 rotates 135 degrees from the reference position (0 degrees), and applies the drive pulse P2 which is the second pulse having the stable stationary position at 90 degrees or more to the stepping motor 3. The waiting period is provided continuously to the drive pulse P2.

Drive Pulse During the Reverse Polarity of the Embodiment

Next, a drive pulse in a reverse polarity of the embodiment will be described with reference to FIGS. 9 to 11, and 12.

Figure 12:
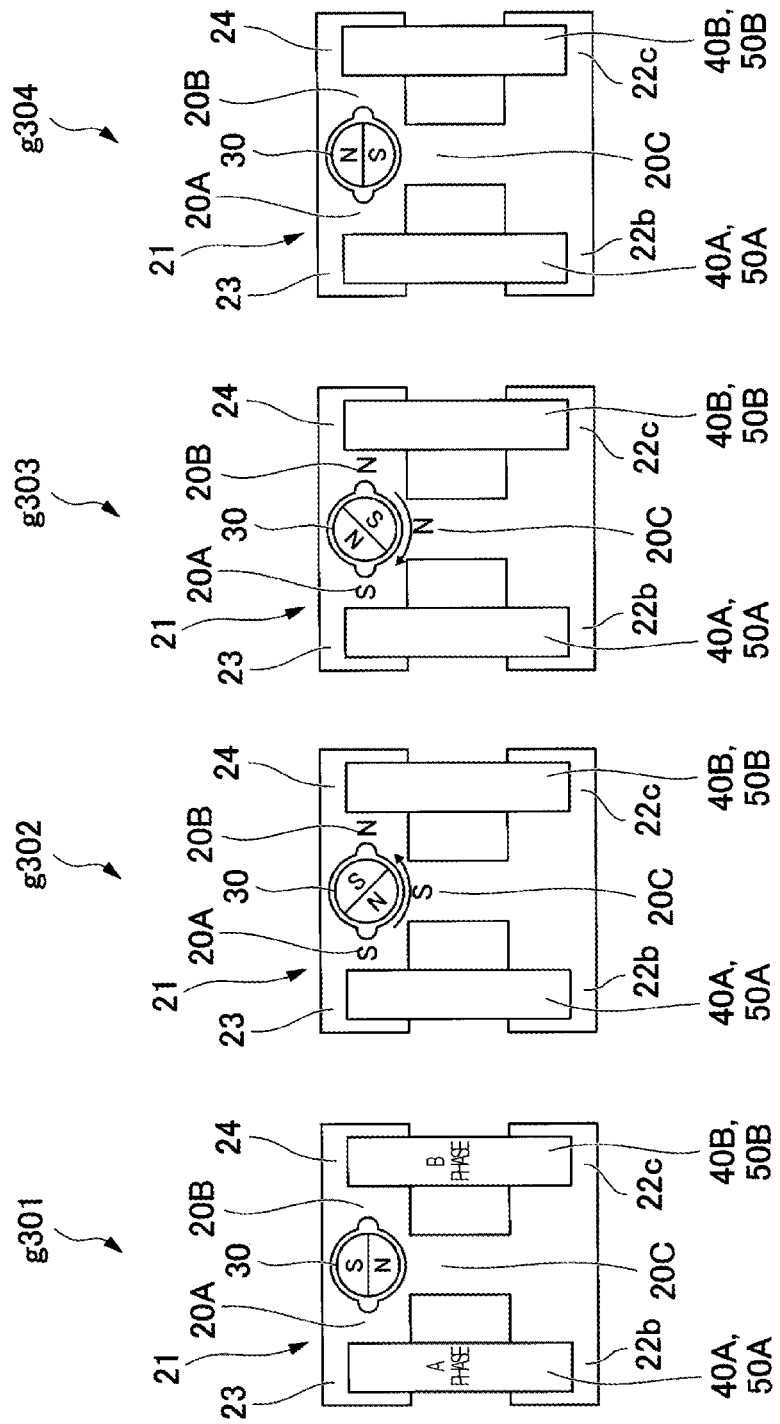
FIG. 12 is a view illustrating a state of a stepping motor 3 according to the firm embodiment when applying a drive pulse in a reverse polarity.

FIG. 12 is a view illustrating a state of the stepping motor 3 according to the embodiment when applying the drive pulse during the reverse polarity. Moreover, FIG. 12 is an example in which, for example, the analog electronic timepiece 1 is dropped and the polarities of the rotor 30 and the drive pulse are shifted.

Symbol g301 in FIG. 12 represents a state where the drive pulse is not applied to the first coil 50A and the second coil 50B, and the motor 3 is stopped. In this case, the rotation angle of the rotor 30 is 180 degrees.

During a period of time0 to t1 in FIG. 9, the drive pulse generation circuit 14 applies the drive pulse of 45 degrees to the stepping motor 3 as the drive pulse P1.

As a result of applying the drive pulse P1, as represented by symbol g302 in FIG. 12, the magnetic field is generated and the rotor 30 starts the rotation in the negative direction (counterclockwise). The rotor 30 is out of step by the process.

Subsequently, during a period of time t1 to t2 in FIG. 9, the drive pulse generation circuit 14 applies the drive pulse of 135 degrees to the stepping motor 3 as the drive pulse P2.

As a result of applying the drive pulse P2, as represented by symbol g303 in FIG. 12, the magnetic field is generated, and the rotor 30 reverses and starts the rotation in the positive direction.

Subsequently, during a period of time t2 to t3 in FIG. 9, the drive pulse generation circuit 14 provides the waiting period.

As represented by the symbol g304 in FIG. 12, the rotor 30 is rotated by inertia from a rotation position of −45 degrees to the rotation position of 180 degrees which is a stable stationary position (second stop position), and is stopped at the stable stationary position of the non-excitation state by the waiting period.

The rotor 30 is not rotated and returns to the original rotation angle by the process of time0 to t13. As described above, in a case where the polarities of the rotor 30 and the drive pulse are shifted, after stepping out of 1Step, the polarity of the rotor 30 matches that of the drive pulse.

The process of the period of time t13 to t16 is the same as that of the drive pulse (FIG. 9) of time t3 to t6, and the rotation angle of the rotor 30 is the same as that of symbols g205 to g208 in FIG. 10.

That is, during the period of time t3 to t6, the rotor 30 is rotated by the drive pulse P1 from 180 degrees to 225 degrees, and is rotated by the drive pulse P2 from 225 degrees to 315 degrees. Thereafter, during the waiting period, the rotor 30 is rotated by inertia from 315 degrees to 0 degrees, and returns to a normal position.

Drive Pulse During the Reverse Rotation of the Embodiment

Next, a drive pulse during a reverse rotation will be described.

Figures 13, 14:
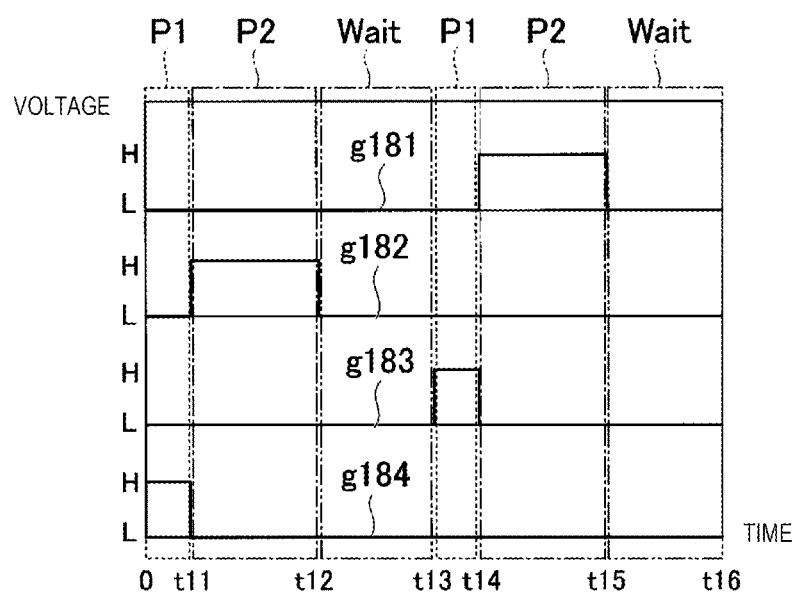
FIG. 13 is a view illustrating a drive pulse waveform according to the first embodiment during the reverse rotation.
FIG. 14 is a table illustrating a combination of a drive pulse P1, a drive pulse P2, and a waiting period according to the first embodiment.

FIG. 13 is a view illustrating a drive pulse waveform according to the embodiment during the reverse rotation. Symbol g181 is a drive pulse applied to the first terminal Out1 of the second coil 50B. Symbol g182 is a drive pulse applied to the second terminal Out2 of the second coil 50B. Symbol g183 is a drive pulse applied to the first terminal Out3 of the first coil 50A. Symbol g184 is a drive pulse applied to the second terminal Out4 of the first coil 50A.

(Step S11) During a period of time0 to t11 in FIG. 13, the drive pulse generation circuit 14 applies a drive pulse of 315 degrees to the stepping motor 3 as the drive pulse P1. That is, as represented by the symbol g181 and the symbol g182, the drive pulse generation circuit 14 applies L to the first terminal Out1 and the second terminal Out2 of the second coil 50B. In addition, as represented by the symbol g183 and the symbol g184, the drive pulse generation circuit 14 applies L to the first terminal Out3 of the first coil 50A, and applies H to the second terminal Out4 of the first coil 50A. The period of the drive pulse P1 is substantially 0.75 ms.

As a result of applying the drive pulse P1, the rotor 30 starts the rotation in the negative direction. In a case where the rotor 30 exceeds the stable stationary position of the drive pulse of −45 degrees depending on the magnitude of the drive voltage or the load, the torque acts as the brake.

(Step S12) Subsequently, during a period of time t11 to t12, the drive pulse of 225 degrees is applied to the stepping motor 3 as the drive pulse P2. That is, the drive pulse generation circuit 14 applies L to the first terminal Out1 of the second coil 50B, and applies H to the second terminal Out2 of the second coil 50B. In addition, the drive pulse generation circuit 14 applies L to the first terminal Out3 and the second terminal Out4 of the first coil 50A. The period of the drive pulse P2 is substantially 2.25 ms.

As a result of applying the drive pulse P2, the rotor 30 continues the rotation in the negative direction and rotates −90 degrees or more.

(Step S13) Subsequently, during a period of time t12 to t13, the drive pulse generation circuit 14 provides the waiting period.

The rotor 30 is rotated by inertia from a rotation position of −135 degrees to a rotation position of −180 degrees which is a stable stationary position (second stop position), and is stopped at the stable stationary position of the non-excitation state by the waiting period.

(Step S14) Subsequently, during a period of time t13 to t14, the drive pulse generation circuit 14 applies the drive pulse of 135 degrees to the stepping motor 3 as the drive pulse P1. That is, the drive pulse generation circuit 14 applies L to the first terminal Out1 and the second terminal Out2 of the second coil 50B. In addition, the drive pulse generation circuit 14 applies H to the first terminal Out3 of the first coil 50A, and applies L to the second terminal Out4 of the first coil 50A. The period of the drive pulse P1 is substantially 0.75 ms.

As a result of applying the drive pulse P1, the rotor 30 starts the rotation in the negative direction. In a case where the rotor 30 exceeds the stable stationary position of the drive pulse of −225 degrees depending on the magnitude of the drive voltage or the load, the torque acts as the brake.

(Step S15) Subsequently, during a period of time t14 to t15, the drive pulse generation circuit 14 applies the drive pulse of 45 degrees to the stepping motor 3 as the drive pulse P2. That is, the drive pulse generation circuit 14 applies H to the first terminal Out1 of the second coil 50B, and applies L to the second terminal Out2 of the second coil 50B. In addition, as represented by the symbol g183 and the symbol g184, the drive pulse generation circuit 14 applies L to the first terminal Out3 and the second terminal Out4 of the first coil 50A. The period of the drive pulse P2 is substantially 2.25 ms.

As a result of applying the drive pulse P2, the rotor 30 continues the rotation in the negative direction and rotates −90 degrees or more.

(Step S16) Subsequently, during a period of time t15 to t16, the waiting period is provided.

The rotor 30 is rotated by inertia from the rotation position of −315 degrees to the rotation position of 0 degrees which is the stable stationary position (first stop position), and is stopped at the stable stationary position of the non-excitation state by the waiting period.

As described above, when the rotor 30 rotates reversely, the drive pulse generation circuit 14 applies the drive pulse in the order of the drive pulse P1 of 315 degrees, the drive pulse P2 of 225 degrees, the waiting period, the drive pulse P1 of 135 degrees, the drive pulse P2 of 45 degrees, and the waiting period.

Modification Example

Moreover, in the example described above, an example, in which the drive pulse P1 is the drive pulse of 45 degrees and the drive pulse P2 is the drive pulse of 135 degrees, is described, but the present disclosure is not limited to the example. As illustrated in FIG. 14, the drive pulse P1 is the drive pulse of 90 degrees, the drive pulse P2 is the drive pulse of 135 degrees, and the drive pulses P1 and P2 may be combined. FIG. 14 is a table illustrating a combination of the drive pulse P1, the drive pulse P2, and the waiting period according to the embodiment.

Here, as described above, the drive pulse of 90 degrees is a drive pulse in which the first terminal Out1 of the second coil 50B is H, the second terminal Out2 of the second coil 50B is L, the first terminal Out3 of the first coil 50A is H, and the second terminal Out4 of the first coil 50A is L.

A driving method of the motor 3, in which the drive pulse P1 is the drive pulse of 90 degrees, the drive pulse P2 is the drive pulse (if 135 degrees, and the rotor 30 rotates forward by the combination, will be described.

(Step S21) First, the drive pulse generation circuit 14 applies the drive pulse P1 of 90 degrees to the stepping motor 3. Therefore, as represented by the symbol g103 in FIG. 3, the magnetic field is generated, and the rotor 30 starts the rotation from the reference position (0 degrees) in the positive direction. In a case where the rotor 30 exceeds the stable stationary position of the drive pulse of 90 degrees depending on the magnitude of the drive voltage or the load, the torque acts as the brake.

(Step S22) Subsequently, the drive pulse veneration circuit 14 applies the drive pulse P2 of 135 degrees to the stepping motor 3. Therefore, as represented by the symbol g104 in FIG. 3, the magnetic field is generated, the rotor 30 continues the rotation in the positive direction, and rotates 90 degrees or more.

(Step S23) Subsequently, the drive pulse veneration circuit 14 provides the waiting period. The rotor 30 is rotated by inertia from the rotation position of 135 degrees to the rotation position of 180 degrees which is the stable stationary position (second stop position), and is stopped at the stable stationary position of the non-excitation state by the waiting period.

(Step S24) Subsequently, the drive pulse generation circuit 14 applies the drive pulse P1 of 270 degrees to the stepping motor 3. Therefore, as represented by the symbol g108 in FIG. 4, the magnetic field is generated, and the rotor 30 starts the rotation in the positive direction. In a case where the rotor 30 exceeds the stable stationary position of the drive pulse of 270 degrees depending on the magnitude of the drive voltage or the load, the torque acts as the brake.

(Step S25) Subsequently, the drive pulse generation circuit 14 applies the drive pulse P2 of 315 degrees to the stepping motor 3. Therefore, as represented by the symbol g109 in FIG. 4, the magnetic field is generated, the rotor 30 continues the rotation in the positive direction, and rotates 90 degrees or more.

(Step S26) Subsequently, the drive pulse generation circuit 14 provides the waiting period. The rotor 30 is rotated by inertia from the rotation position of 315 degrees to the rotation position of 0 degrees which is the stable stationary position (first stop position), and is stopped at the stable stationary position of the non-excitation state by the waiting period.

As described above, in the modification example, when the rotor 30 rotates forward, the drive pulse generation circuit 14 applies the drive pulse in the order of the drive pulse P1 of 90 degrees, the drive pulse P2 of 135 degrees, the waiting period, the drive pulse P1 of 270 degrees, the drive pulse P2 of 315 degrees, and the waiting period.

Moreover, in the modification example, when the rotor 30 rotates reversely, the drive pulse generation circuit 14 applies the drive pulse in the order of the drive pulse P1 of 315 degrees, the drive pulse P2 of 270 degrees, the waiting period, the drive pulse P1 of 135 degrees, the drive pulse P2 of 90 degrees, and the waiting period.

As described above, in the modification example, during the forward rotation, first, the rotor 30 rotates 90 degrees from the reference position (0 degrees), and applies the drive pulse P1 which is the first pulse having the stable stationary position at 90 degrees or less to the stepping motor 3. In the modification example, during the forward rotation, continuously to the drive pulse P1, the rotor 30 rotates 135 degrees from the reference position (0 degrees), and applies the drive pulse P2 which is the second pulse having the stable stationary position at 90 degrees or more to the stepping motor 3. The waiting period is provided continuously to the drive pulse P2.

As described above, in the embodiment, during the forward rotation, the drive pulse generation circuit 14 applies the drive pulse P1 of 45 degrees or 90 degrees, and then applies the drive pulse P2 of 135 degrees, and the waiting period is provided after the application of the drive pulse P2. In the embodiment, the application time (for example, 2.25 ms) of the drive pulse P2 is set longer than the application time (for example, 0.75 ms) of the drive pulse P1. In addition, in the embodiment, the waiting period is set to 0.5 ms or more. The waiting period is substantially 0.5 ms to 2 ms because it is necessary to secure a time for the rotor 30 to return during the reverse polarity.

Moreover, since a ratio of a feed angles is 45 degrees:90 degrees, the application time of the drive pulse P1 may be ½ or less of the application time of the drive pulse P2 from this ratio.

It was confirmed by experiments that if the application time of the drive pulse P1 is 0.75 ms and the application time of the drive pulse P2 is 2.25 ms, it is possible to obtain a braking effect during the high voltage. Therefore, the application time of the drive pulse P1 is set to ⅕ or more of the application time of the drive pulse P2.

Moreover, a relationship between an operation voltage and the P1/P2 ratio between the drive pulse P1 and the drive pulse P2 will be described later.

As described above, according to the embodiment, with the configuration described above, during the high voltage, the brake is applied by the drive pulse P1 and it is possible to suppress an excessive torque. In addition, according to the embodiment, with the configuration described above, during the low voltage, even if the rotation of the rotor 30 is insufficient, it is possible to secure the torque by the drive pulse P1. As a result, according to the embodiment, it is possible to suppress stepping out in a wide voltage range without using a complicated system such as a rotation direction detection circuit.

Second Embodiment

In a second embodiment, an example, in which the drive pulse P1 of 90 degrees, the drive pulse P2 of 180 degrees, the waiting period are 1Step, will be described.

Figure 15:
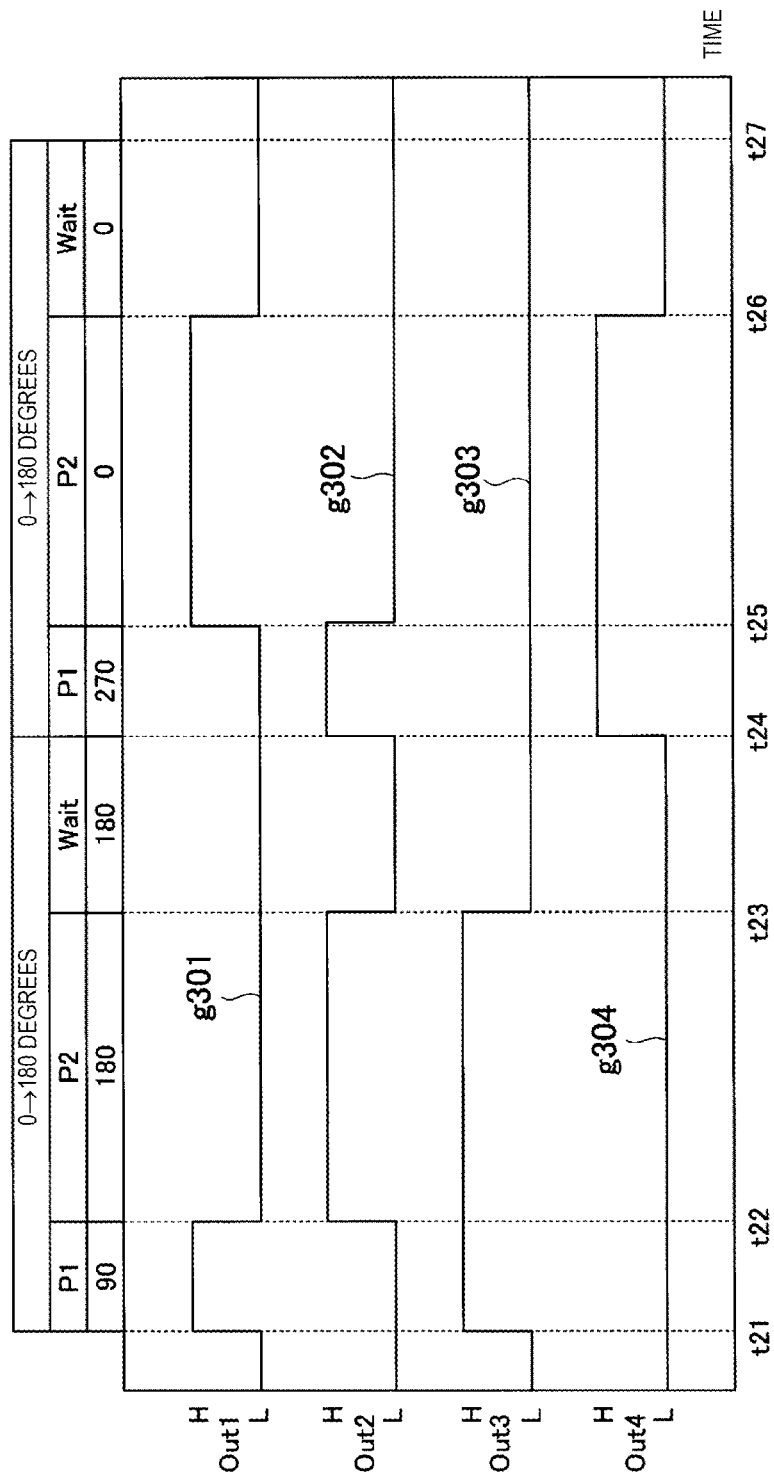
FIG. 15 is a graph illustrating a drive pulse waveform according to a second embodiment during the forward rotation.

FIG. 15 is a graph illustrating a drive pulse waveform according to the embodiment during the forward rotation. Symbol g301 is a drive pulse applied to the first terminal Out1 of the second coil 50B. Symbol g302 is a drive pulse applied to the second terminal Out2 of the second coil 50B. Symbol g303 is a drive pulse applied to the first terminal Out3 of the first coil 50A. Symbol g304 is a drive pulse applied to the second terminal Out4 of the first coil 50A.

(Step S31) As illustrated in FIG. 15, during a period of time t21 to t22, the drive pulse generation circuit 14 applies the drive pulse P1 of 90 degrees to the stepping motor 3. That is, the drive pulse generation circuit 14 applies H to the first terminal Out1 of the second coil 50B, applies L to the second terminal Out2 of the second coil 50B applies H to the first terminal Out3 of the first coil 50A, and applies L to the second terminal Out4 of the first coil 50A.

As represented by the symbol g103 in FIG. 3, the magnetic field is generated and the rotor 30 starts the rotation in the forward direction by application of the drive pulse P1 of 90 degrees. In a case where the rotor 30 exceeds the stable stationary position of the drive pulse of 90 degrees depending on the magnitude of the drive voltage or the load, the torque acts as the brake.

(Step S32) Subsequently, during a period of time t22 to t23, the drive pulse generation circuit 14 applies the drive pulse P2 of 180 degrees to the stepping motor 3. That is, the drive pulse generation circuit 14 applies L to the first terminal Out1 of the second coil 50B, applies H to the second terminal Out2 of the second 50B, applies H to the first terminal Out3 of the first coil 50A, and applies L to the second terminal Out4 of the first coil 50A.

As represented by the symbol g105 in FIG. 3, the magnetic field is generated, the rotor 30 continues the rotation in the forward direction, and rotates 90 degrees or more by the application of the drive pulse of 180 degrees.

(Step S33) Subsequently, during a period of time t23 to t24, the drive pulse generation circuit 14 is in the state of the waiting period.

As a result, the rotor 30 stops at the second stop position of the angle of 180 degrees in the positive direction.

(Step S34) Subsequently, during a period of time t24 to t25, the drive pulse generation circuit 14 applies the drive pulse P1 of 270 degrees to the stepping motor 3. That is, the drive pulse generation circuit 14 applies L to the first terminal Out1 of the second coil 50B, applies H to the second terminal Out2 of the second coil 50B, applies L to the first terminal Out3 of the first coil 50A, and applies H to the second terminal Out4 of the first coil 50A.

As represented by the symbol g108 in FIG. 3, the magnetic field is generated, and the rotor 30 starts the rotation in the forward direction by the application of the drive pulse P1 of 270 degrees. In a case where the rotor 30 exceeds the stable stationary position of the drive pulse of 270 degrees depending on the magnitude of the drive voltage or the load, the torque acts as the brake.

(Step S35) Subsequently, during a period of time t25 to t26, the drive pulse generation circuit 14 applies the drive pulse P2 of 0 degrees to the stepping motor 3. That is, the drive pulse generation circuit 14 applies H to the first terminal Out1 of the second coil 50B, applies L to the second terminal Out2 of the second coil 50B, applies L to the first terminal Out3 of the first coil 50A, and applies H to the second terminal Out of the first coil 50A.

As represented by the symbol g110 in FIG. 3, the magnetic field is generated, the rotor 30 continues the rotation in the forward direction, and rotates 90 degrees or more by the application of the drive pulse P2 of 0 degrees.

(Step S36) Subsequently, during a period of time t25 to t26, the drive pulse generation circuit 14 is in the state of the waiting period.

As a result, the rotor 30 stops at the first stop position of the angle of 0 degrees.

As described above, in the embodiment, during the forward rotation, the drive pulse generation circuit 14 applies the drive pulse in the order of the drive pulse P1 of 90 degrees, the drive pulse P2 of 180 degrees, the waiting period, the drive pulse P1 of 270 degrees, the drive pulse P2 of 0 degrees, and the waiting period.

Moreover, the application time (energy) of the drive pulse P2 is larger than the application time (energy) of the drive pulse P1.

As described above, in the embodiment, during the forward rotation, first, the rotor 30 rotates 90 degrees from the reference position (0 degrees), and applies the drive pulse P1 which is the first pulse having the stable stationary position at 90 degrees or less to the stepping motor 3. In the embodiment, during the forward rotation, continuously to the drive pulse P1, the rotor 30 rotates 180 degrees from the reference position (0 degrees), and applies the drive pulse P2 which is the second pulse having the stable stationary position at 90 degrees or more to the stepping motor 3. The waiting period is provided continuously to the drive pulse P2.

Figure 16:
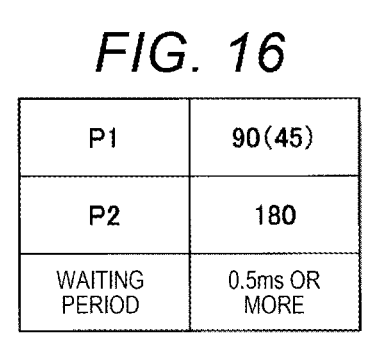

Moreover, also in the embodiment, as illustrated in FIG. 16, the waiting period is 0.5 ms or more and, for example, 0.5 to 2 ms.

Moreover, during the reverse rotation, the drive pulse generation circuit 14 applies the drive pulse in the order of the drive pulse P1 of 0 degrees, the drive pulse P2 of 270 degrees, the waiting period, the drive pulse P1 of 180 degrees, the drive pulse P2 of 90 degrees, and the waiting period.

Moreover, in the example described above, an example, in which the drive pulse P1 is 90 degrees during the forward rotation, is described, but as illustrated in FIG. 16, the drive pulse P1 may be 45 degrees. FIG. 16 is a table illustrating a combination of the drive pulse P1, the drive pulse P2, and the waiting period according to the embodiment.

Modification Example

In a case where the drive pulse P1 is 45 degrees, during the forward rotation, the drive pulse generation circuit 14 may apply the drive pulse in the order of the drive pulse P1 of 45 degrees, the drive pulse P2 of 180 degrees, the waiting period, the drive pulse P1 of 225 degrees, the drive pulse P2 of 0 degrees, and the waiting period.

In addition, during the reverse rotation, the drive pulse generation circuit 14 may apply the drive pulse in the order of the drive pulse P1 of 0 degrees, the drive pulse P2 of 225 degrees, the waiting period, the drive pulse P1 of 180 degrees, the drive pulse P2 of 45 degrees, and the waiting period.

As described above, in the modification example, during the forward rotation, first, the rotor 30 rotates 45 degrees from the reference position (0 degrees), and applies the drive pulse P1 which is the first pulse having the stable stationary position at 90 degrees or less to the stepping motor 3. In the modification example, during the forward rotation, continuously to the drive pulse P1, the rotor 30 rotates 180 degrees from the reference position (0 degrees), and applies the drive pulse P2 which is the second pulse having the stable stationary position at 90 degrees or more to the stepping motor 3. The waiting period is provided continuously to the drive pulse P2.

As described above, according to the embodiment, with the configuration described above, similar to the first embodiment, during the high voltage, the brake is applied by the drive pulse P1 and it is possible to suppress an excessive torque. In addition, according to the embodiment, with the configuration described above, during the to voltage, even if rotation of the rotor 30 is insufficient, it is possible to secure the torque by the drive pulse P1. As a result, according to the embodiment, it is possible to suppress stepping out in a wide voltage range without using a complicated system such as a rotation direction detection circuit.

Third Embodiment

In a third embodiment, an example, in which the first drive pulse P1 of 45 degrees, the second drive pulse P1 of 90 degrees, the first drive pulse P2 of 135 degrees, the second drive pulse P2 of 180 degrees, and the waiting period are 1Step, will be described.

Figure 17:
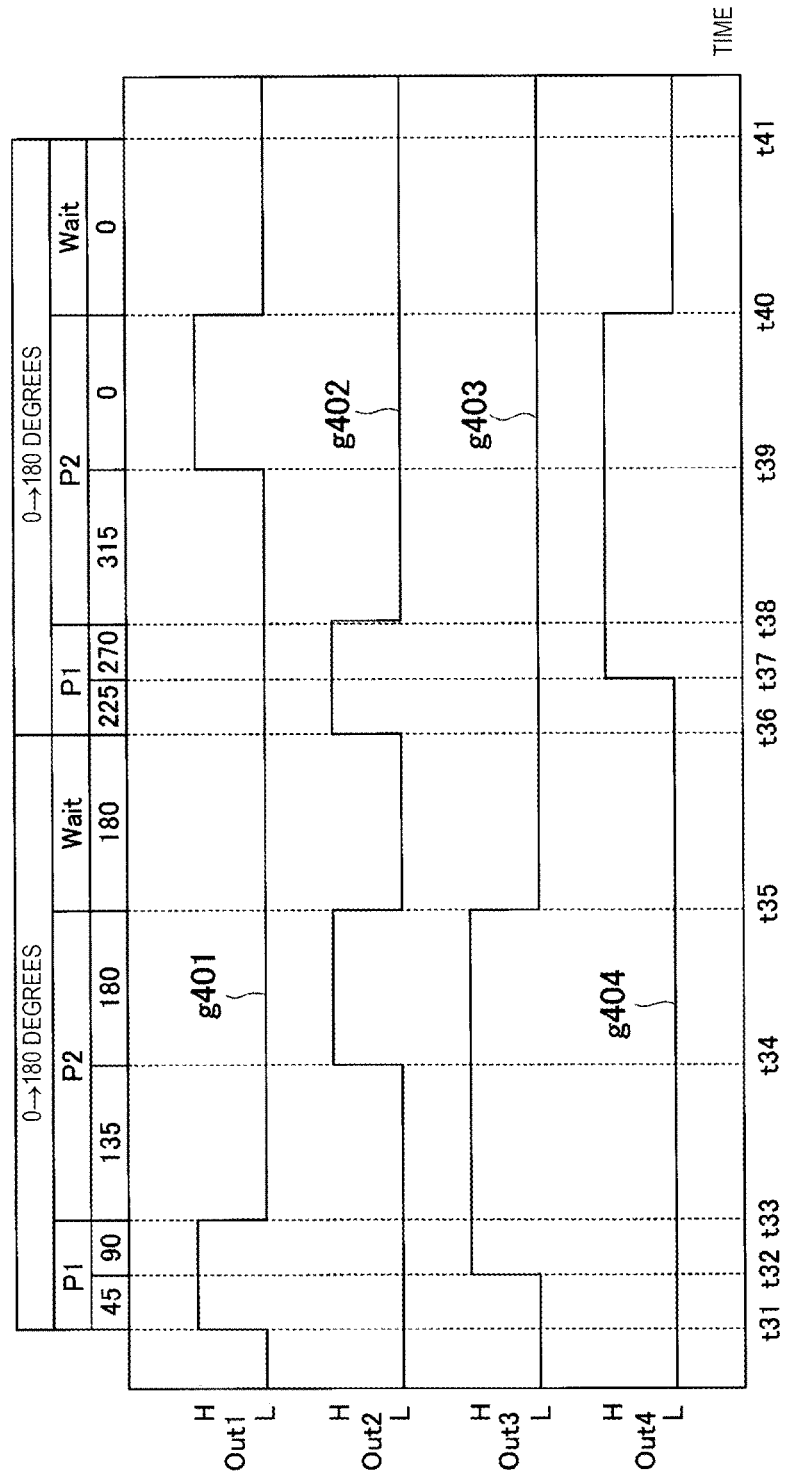
FIG. 17 is a graph illustrating a drive pulse waveform according to a third embodiment during the forward rotation.

FIG. 17 is a graph illustrating a drive pulse waveform according to the embodiment during the forward rotation. Symbol g401 is a drive pulse applied to the first terminal Out1 of the second coil 50B. Symbol g402 is a drive pulse applied to the second terminal Out2 of the second coil 50B. Symbol g403 is a drive pulse applied to the first terminal Out3 of the first coil 50A. Symbol g404 is a drive pulse applied to the second terminal Out4 of the first coil 50A.

(Step S41) As illustrated in FIG. 17, during a period of time t31 to t32, the drive pulse generation circuit 14 applies the first drive pulse P1 of 45 degrees to the stepping motor 3. That is, the drive pulse generation circuit 14 applies H to the first terminal Out1 of the second coil 50B, applies L to the second terminal Out2 of the second coil 50B, and applies L to the first terminal Out3 and the second terminal Out4 of the first coil 50A.

As represented by the symbol g102 in FIG. 3, the magnetic field is generated, and the rotor 30 starts the rotation in the forward direction by the application of the first drive pulse P1 of 45 degrees. In a case where the rotor 30 exceeds the stable stationary position (first angle) of the drive pulse of 45 degrees depending on the magnitude of the drive voltage or the load, the torque acts as the brake.

(Step S42) Subsequently, during a period of time t32 to t33, the drive pulse generation circuit 14 applies the second drive pulse P1 of 90 degrees to the stepping motor 3. That is, the drive pulse generation circuit 14 applies H to the first terminal Out1 of the second coil 50B, applies L to the second terminal Out2 of the second coil 50B, applies H to the first terminal Out3 of the first coil 50A, and applies L to the second terminal Out4 of the first coil 50A.

As represented by the symbol g103 in FIG. 3, the magnetic field is generated, and the rotor 30 starts the rotation in the forward direction by the application of the second drive pulse P1 of 90 degrees. In a case where the rotor 30 exceeds the stable stationary position (second angle) of the drive pulse of 90 degrees depending on the magnitude of the drive voltage or the load, the torque acts as the brake.

(Step S43) Subsequently, during a period of time t33 to t34, the drive pulse generation circuit 14 applies the first dove pulse P2 of 135 degrees to the stepping motor 3. That is, the drive pulse generation circuit 14 applies L to the first terminal Out1 and the second terminal Out2 of the second coil 50B, applies H to the first terminal Out3 of the first coil 50A, and applies L to the second terminal Out4 of the first coil 50A.

As represented by the symbol g104 in FIG. 3, the magnetic field is generated by the application of the first drive pulse P2 of 135 degrees, the rotor 30 continues the rotation in the forward direction, and rotates 45 degrees (135 degrees (third angle)=90+45 degrees).

(Step S44) Subsequently, during a period of time t35 to t36, the drive pulse generation circuit 14 applies the second drive pulse P2 of 180 degrees to the stepping motor 3. That is, the drive pulse generation circuit 14 applies L to the first terminal Out1 of the second coil 50B, applies H to the second terminal Out2 of the second coil 50B, applies H to the first terminal Out3 of the first coil 50A, and applies L to the second terminal Out4 of the first coil 50A.

As represented by the symbol g105 in FIG. 3, the magnetic field is generated by the application of the drive pulse P2 of 180 degrees, the rotor 30 continues the rotation in the forward direction, and rotates 45 degrees (180 degrees (fourth angle)=135+45 degrees) or more.

(Step S45) Subsequently, during a period of time t35 to t36, the drive pulse generation circuit 14 is in the state of the waiting period.

As a result, the rotor 30 stops at the stable stationary position of the non-excitation state which is in the second stop position of the angle of 180 degrees.

(Step S46) Subsequently, during a period of time t36 to t37, the drive pulse generation circuit 14 applies the first drive pulse P1 of 225 degrees to the stepping motor 3. As a result, the rotor 30 starts the rotation in the positive direction. In a case where the rotor 30 exceeds the stable stationary position (first angle) of the drive pulse of 225 degrees depending on the magnitude of the drive voltage or the load, the torque acts as the brake.

(Step S47) Subsequently, during a period of time t37 to t38, the drive pulse generation circuit 14 applies the second drive pulse P1 of 270 degrees to the stepping motor 3. As a result, the rotor 30 starts the rotation in the positive direction. In a case where the rotor 30 exceeds the stable stationary position (second angle) of the drive pulse of 270 degrees depending on the magnitude of the drive voltage or the load, the torque acts as the brake.

(Step S48) Subsequently, during a period of time t38 to t39, the drive pulse generation circuit 14 applies the first drive pulse P2 of 315 degrees to the stepping motor 3. As a result, the rotation in the forward direction is continued and the rotor 30 rotates 45 degrees (315 degrees (third angle) =270+45 degrees) or more.

(Step S49) Subsequently, during a period of time t39 to t40, the drive pulse generation circuit 14 applies the second drive pulse P2 of 0 degrees. As a result, the rotation in the forward direction is continued and the rotor 30 rotates 45 degrees (0 degrees (fourth angle)=315+45 degrees) or more.

(Step S50) Subsequently, during a period of time t40 to t41, the drive pulse generation circuit 14 is in the state of the waiting period. As a result, the rotor 30 stops at the stable stationary position of the non-excitation state which is in the first stop position of the angle of 0 degrees.

Moreover, the application time (energy) of the drive pulse P2 (first drive pulse P2 and second drive pulse P2) is larger than the application time (energy) of the drive pulse P1 (first drive pulse P1 and second drive pulse P1).

FIG. 18 is a table illustrating a combination of the drive pulse P1, the drive pulse P2, and the waiting period according to the embodiment.

As illustrated in FIGS. 17 and 18, during the forward rotation, the drive pulse generation circuit 14 applies the drive pulse in the order of the first drive pulse P1 of 45 degrees, the second drive pulse P1 of 90 degrees, the first drive pulse P2 of 135 degrees, the second drive pulse P2 of 180 degrees, the waiting period, the first drive pulse P1 of 225 degrees, the second drive pulse P1 of 270 degrees, the first drive pulse P2 of 315 degrees, the second drive pulse P2 of 0 degrees, and the waiting period.

Moreover, as illustrated in FIG. 18, the waiting period is 0.5 ms or more and, for example, 0.5 to 2 ms.

Moreover, during the reverse rotation, the drive pulse generation circuit 14 applies the drive pulse in the order of the first drive pulse P1 of 0 degrees, the second drive pulse P1 of 315 degrees, the first drive pulse P2 of 270 degrees, the second drive pulse P2 of 225 degrees, the waiting period, the first drive pulse P1 of 180 degrees, the second drive pulse P1 of 135 degrees, the first drive pulse P2 of 90 degrees, the second drive pulse P2 of 45 degrees, and the waiting period.

As described above, in the embodiment, during the forward rotation, first, the rotor 30 rotates 45 degrees (first angle) from the reference position (0 degrees), and applies the first drive pulse P1 having the stable stationary position at 90 degrees or less to the stepping motor 3. Subsequently, in the embodiment, continuously to the first drive pulse P1, the rotor 30 rotates 90 degrees (second angle) from the reference position (0 degrees), and applies the second drive pulse P1 having the stable stationary position at 90 degrees or less to the stepping motor 3. Subsequently, in the embodiment, continuously to the second drive pulse P1, the rotor 30 rotates 135 degrees (third angle) from the reference position (0 degrees), and applies the first drive pulse P2 having the stable stationary position at 90 degrees or less to the stepping motor 3. Subsequently, in the embodiment, continuously to the first drive pulse P2, the rotor 30 rotates 180 degrees (fourth angle) from the reference position (0 degrees), and applies the second drive pulse P2 having the stable stationary position at 90 degrees or more to the stepping motor 3. The waiting period is provided continuously to the drive pulse P2.

As described above, according to the embodiment, the drive pulse P1 is constituted of the continuous first drive pulse P1 of 45 degrees and the second drive pulse P1 of 90 degrees. The drive pulse P2 is constituted of the continuous first drive pulse P2 of 135 degrees and the second drive pulse P2 of 180 degrees.

Similar to the first embodiment, with the configuration described above, during the high voltage, the brake is applied by the drive pulse P1 and it is possible to suppress an excessive torque. In addition, according to the embodiment, with the configuration described above, during the low voltage, even if the rotation of the rotor 30 is insufficient, it is possible to secure the torque by the drive pulse P1. As a result, according to the embodiment, it is possible to suppress stepping out in a wide voltage range without using a complicated system such as a rotation direction detection circuit.

Furthermore, in the embodiment, since the drive pulses P1 and P2 are divided into two, it is possible to further obtain effects that fluctuation of the torque is suppressed, and the vibration and noise during the rotation are reduced.

Drive Voltage, and Ratio of Drive Pulse P1 and Drive Pulse P2

Next, the drive voltage, and a ratio of the drive pulse P1 and the drive pulse P2 will be described with reference to FIGS. 19 and 20.

FIG. 19 is a graph illustrating a relationship between a ratio of the drive pulse P1 and the drive pulse P2, and a maximum operation voltage, and a relationship between the ratio of the drive pulse P1 and the drive pulse P2, and a minimum operation voltage. In FIG. 19, a horizontal axis represents the ratio (P1/P2) of the drive pulse P1 and the drive pulse P2, and a vertical axis represents the operation voltage [V].

Symbol g501 represents a relationship between P1/P2 in the maximum operation voltage and the operation voltage. Symbol g502 represents a relationship between P1/P2 in the minimum operation voltage and the operation voltage. Symbol g503 represents a straight line approximating the relationship represented by the symbol g501 in a range (P1/P2 is in a range of 33% to 50%) which is stably operated in the maximum operation voltage.

Symbol g511 represents a brake shortage region. Symbol g512 represents an operation range. Symbol g513 represents a reverse region during the reverse polarity. Moreover, the reverse region during the reverse polarity is a region in which an operation that the rotor is reversed during the reverse polarity is generated.

FIG. 20 is a table illustrating a drive pulse P1 ratio, a drive pulse P2 ratio, P1/P2, a maximum operation voltage, a minimum operation voltage, and a difference between the maximum operation voltage and the minimum operation voltage.

As illustrated in FIGS. 19 and 20, when the drive pulse P1 is ⅕ (20%) or less of the drive pulse P2, the braking effect during the high voltage (maximum operation voltage) decreases and the operation range is reduced. Therefore, in the first embodiment to the third embodiment, in order to correspond to a wide voltage range, it is preferable that the drive pulse P1 is ⅕ (20%) or more of the drive pulse P2. Moreover, the inventors of the present application have confirmed the braking effect by experiments.

In addition, as illustrated in FIGS. 19 and 20, when the drive pulse P1 is ½ (50%) or more of the drive pulse P2, the reverse region during the reverse polarity increases. Therefore, in the first embodiment to the third embodiment, in order to correspond to the wise voltage range, it is preferable that the drive pulse P1 is ½ (50%) or less of the drive pulse P2.

As described above, in the first embodiment to the third embodiment, input energy into the stepping motor 3 is set such that the drive pulse P2>the drive pulse P1.

The input energy into the stepping motor 3 is adjusted by the application time by the drive pulse generation circuit 14 based on the control of the control circuit 13.

Alternatively, the energy to the stepping motor 3 may be adjusted by a Duty ratio of the drive pulse by a Pulse Width Modulation (PWM) by the drive pulse generation circuit 14 based on the control of the control circuit 13.

Alternatively, the energy to the stepping motor 3 may be adjusted by a magnitude of a voltage by the drive pulse generation circuit 14 based on the control of the control circuit 13.

Moreover, it is also possible to combine the first embodiment to the third embodiment described above. For example, the forward rotation may be controlled by the method of the first embodiment and the reverse rotation may be controlled by the method of the second embodiment.

Moreover, a program for realizing all or a part of the functions of the control unit 2 in the present disclosure is recorded in a recording medium readable by a computer system, the computer system reads the program recorded in the recording medium, and the system executes the program. Therefore, all or a part of the processes performed by the control unit 2 may be performed. Here, the "computer system" includes an OS and hardware such as peripheral devices. The "computer system" also includes a WWW system provided with a homepage providing environment (or display environment). The "computer-readable recording medium" means a portable medium such as a flexible disk, a magneto-optical disk, a ROM, a CD-ROM, or a storage device such as a hard disk built in a computer system. Furthermore, the "computer-readable recording medium" includes a recording medium which holds the program for a fixed time, as a volatile memory (RAM) in a computer system serving as a server or a client when in a case where a program is transmitted via a network such as the Internet or a communication line such as a telephone line.

In addition, the program may be transmitted from a computer system in which the program is stored in a storage device or the like to another computer system via a transmission medium or by transmission waves in the transmission medium. Here, the "transmission medium" for transmitting the program refers to a medium having a function of transmitting information, as a network (communication network) such as the Internet or a communication channel (communication line) such as a telephone line. In addition, the program may be a program for realizing a part of the functions described above.

Furthermore, it may be a so-called difference file (difference program) that can realize the functions described above by a combination of programs already recorded in the computer system.

Although the embodiments of the present disclosure have been described above, the present disclosure is not limited to these embodiments in any way, and various modifications and substitutions may be made without departing from the scope of the present disclosure.

What is claimed is:

1. A motor driving apparatus comprising:
a pulse generation circuit applying a drive pulse for rotating a rotor to a two-phase stepping motor including the rotor magnetized in two poles and a stator in which a two-phase coil is wound around a yoke,
wherein the drive pulse is constituted of a drive pulse P1 and a drive pulse P2, energy of the drive pulse P2 being larger than energy of the drive pulse P1, and
wherein the pulse generation circuit applies the drive pulse P1 having a stable stationary position at which a rotor rotation angle from a reference position is 90 degrees or less and applies the drive pulse P2 having a stable stationary position at which the rotor rotation angle from the reference position is 90 degrees or more continuously to the application of the drive pulse P1.

2. The motor driving apparatus according to claim 1, wherein an application time of the drive pulse P1 is shorter than an application time of the drive pulse P2.

3. The motor driving apparatus according to claim 1, wherein an application time of the drive pulse P1 is ½ or less of an application time of the drive pulse P2.

4. The motor driving apparatus according to claim 1, wherein an application time of the drive pulse P1 is ⅕ or more of an application time of the drive pulse P2.

5. The motor driving apparatus according to claim 1, wherein the pulse generation circuit provides a waiting period for stopping the application of the pulse continuously to the application of the drive pulse P2.

6. The motor driving apparatus according to claim 5, wherein the waiting period is 0.5 ms or more and 2 ms or less.

7. The motor driving apparatus according to claim 6, wherein the drive pulse P1 further includes a first drive pulse P1 having a stable stationary position at a first angle at which the rotor rotation angle from the reference position is 90 degrees or less, and a second drive pulse P1 having a stable stationary position at a second angle at which the rotor rotation angle from the reference position is larger than the first angle and 90 degrees or less, and
wherein the drive pulse P2 further includes a first drive pulse P2 having a stable stationary position at a third angle at which the rotor rotation angle from the reference position is 90 degrees or more, and a second drive pulse P2 having a stable stationary position at a fourth angle at which the rotor rotation angle from the reference position is larger than the third angle and 90 degrees or more.

8. A timepiece comprising:
a pointer;
a two-phase stepping motor including a rotor magnetized in two poles and a stator in which a two-phase coil is wound around a yoke, and moving the pointer; and
a pulse generation circuit applying a drive pulse for rotating the rotor to the two-phase stepping motor,
wherein the drive pulse is constituted of a drive pulse P1 and a drive pulse P2, energy of the drive pulse P2 being larger than energy of the drive pulse P1, and
wherein the pulse generation circuit applies the drive pulse P1 having a stable stationary position at which a rotor rotation angle from a reference position is 90 degrees or less and applies the drive pulse P2 having a stable stationary position at which the rotor rotation angle from the reference position is 90 degrees or more continuously to the application of the drive pulse P1.

9. A motor control method in a pulse generation circuit applying a drive pulse for rotating a rotor to a two-phase stepping motor including the rotor magnetized in two poles and a stator in which a two-phase coil is wound around a yoke, the method comprising:
applying a drive pulse P1 having a stable stationary position at which a rotor rotation angle from a reference position is 90 degrees or less by the pulse generation circuit; and
applying a drive pulse P2 having a stable stationary position at which the rotor rotation angle from the reference position is 90 degrees or more by the pulse generation circuit continuously to the application of the drive pulse P1, wherein energy of the drive pulse P2 is larger than energy of the drive pulse P1.

* * * * *

UNITED STATES PATENT AND TRADEMARK OFFICE
CERTIFICATE OF CORRECTION

PATENT NO.        : 10,816,935 B2
APPLICATION NO.   : 16/505311
DATED             : October 27, 2020
INVENTOR(S)       : Tetsuya Nobe It is certified that error appears in the above-identified patent and that said Letters Patent is hereby corrected as shown below:

In the Claims

In Column 24, Claim 7, Line 54, delete "claim 6" and replace with -- claim 1 --.

Signed and Sealed this
Fifth Day of January, 2021

Andrei Iancu
*Director of the United States Patent and Trademark Office*